(12) United States Patent
Marocco

(10) Patent No.: US 6,758,120 B2
(45) Date of Patent: Jul. 6, 2004

(54) BLIND CUT DOWN APPARATUS

(75) Inventor: Norbert Marocco, Woodbridge (CA)

(73) Assignee: Shade-O-Matic Limited, Ontario (CA)

( * ) Notice: Subject to any disclaimer, the term of this patent is extended or adjusted under 35 U.S.C. 154(b) by 187 days.

(21) Appl. No.: 09/935,489

(22) Filed: Aug. 23, 2001

(65) Prior Publication Data

US 2001/0054338 A1 Dec. 27, 2001

Related U.S. Application Data

(63) Continuation-in-part of application No. 09/414,767, filed on Oct. 7, 1999, now abandoned, which is a continuation-in-part of application No. 09/132,748, filed on Aug. 12, 1998, now Pat. No. 6,196,099, which is a continuation-in-part of application No. 08/627,015, filed on Apr. 3, 1996, now Pat. No. 5,806,394, which is a continuation-in-part of application No. 08/526,329, filed on Sep. 11, 1995, now abandoned.

(51) Int. Cl.[7] .......................... B23D 23/00; B26D 1/06; B26D 1/38
(52) U.S. Cl. ................ 83/52; 83/197; 83/451; 83/465; 83/468.7; 83/522.19; 83/566; 83/519; 83/628; 83/616; 83/622; 83/602; 83/604; 83/694; 83/695; 29/24.5
(58) Field of Search ............................... 83/13, 39, 52, 83/157, 196, 197, 198, 199, 200, 465, 451, 522.19, 468, 468.6, 468.7, 560, 628, 629, 519, 514, 452, 633, 622, 616, 454, 440.1, 169, 588, 695, 694, 602, 604; 29/24.5, 33 R, 34 R, 720

(56) References Cited

U.S. PATENT DOCUMENTS

| | | | |
|---|---|---|---|
| 2,644,520 A | 7/1953 | Nelson | 83/198 X |
| 2,728,391 A | 12/1955 | Peddinghaus et al. | 83/198 X |
| 2,789,639 A | 4/1957 | Lorentzen | 83/198 X |
| 3,043,178 A * | 7/1962 | Lorentzen | 83/446 |
| 3,263,541 A | 8/1966 | Stockard, Jr. | 83/197 |
| 3,391,591 A * | 7/1968 | Funke | 83/197 |
| 4,067,252 A | 1/1978 | Peddinghaus et al. | 83/571 |
| 4,807,363 A | 2/1989 | Clifton, Jr. | 30/242 |
| 4,993,131 A | 2/1991 | Graves et al. | 29/24.5 X |
| 5,037,253 A | 8/1991 | Molaro et al. | 29/24.5 X |
| 5,072,494 A | 12/1991 | Graves et al. | 29/24.5 X |

(List continued on next page.)

FOREIGN PATENT DOCUMENTS

| | | | |
|---|---|---|---|
| CA | 582326 | 9/1959 | 29/24.5 |
| FR | 367066 | 10/1906 | 83/515 |
| FR | 10550 | 7/1909 | 83/518 |

OTHER PUBLICATIONS

Four (4) photographs of the Carey–McFall unit of Springs (pneumatic cut–down machine "B") illustrating the cutting portion of the machine.

Letter to Mr. Roy H. Wepner of Lerner, David, Littenberg, Krumholz & Mentlik, LLP dated Apr. 24, 2000, Re: Formal Demand for Springs to Cease and Desist Unfair Competition Against Nien Made (Sheldon & Mak File No. 8376.83).

(List continued on next page.)

*Primary Examiner*—Boyer D. Ashley
(74) *Attorney, Agent, or Firm*—Ohlandt, Greeley, Ruggiero & Perle

(57) ABSTRACT

An apparatus for trimming the width of blinds of the type having a headrail, and a bottom rail and blind slats, and having a support body with a headrail opening, and a bottom rail opening, and a blind slat opening the blind components being insertable into their openings from one side of the support body, a die located adjacent to the support body, a headrail cutting recess in the die, guides on the support body for the die, enabling the die to move relative to the headrail opening between two positions and a bottom rail and blind slat cutter operable to cut the bottom rail and the blind slats. A modified apparatus can be used to trim the width of a vertical blind having a headrail and control rods. Also disclosed is a method of trimming the width of blind, having a head rail, a bottom rail and blind slats.

7 Claims, 18 Drawing Sheets

U.S. PATENT DOCUMENTS

| | | | |
|---|---|---|---|
| 5,103,702 A | 4/1992 | Yannazzone | 83/29 X |
| 5,333,365 A | 8/1994 | Marocco et al. | 29/24.5 X |
| 5,339,716 A | 8/1994 | Sands et al. | 29/24.5 X |
| 5,456,149 A | 10/1995 | Elsenheimer et al. | 29/24.5 X |
| 5,799,557 A | 9/1998 | Wang | 83/639.5 |
| 5,806,394 A | 9/1998 | Marocco | 83/197 |
| 5,816,126 A | 10/1998 | Pluber | 83/167 |
| 5,927,172 A | 7/1999 | Wang | 83/454 |
| 6,079,306 A * | 6/2000 | Liu | 83/454 |
| 6,089,134 A | 7/2000 | Marocco | 83/197 |
| 6,167,789 B1 | 1/2001 | Daniels et al. | |
| 6,178,857 B1 * | 1/2001 | Marocco | 83/52 |
| 6,196,099 B1 * | 3/2001 | Marocco | 83/197 |
| 6,314,851 B1 * | 11/2001 | Graves et al. | 83/553 |
| 6,334,379 B1 * | 1/2002 | Sudano | 83/452 |
| 6,336,388 B1 * | 1/2002 | Marocco | 83/454 |

OTHER PUBLICATIONS

Custom Craft Company Invoice No. 109099, dated Sep. 28, 1929 for PVC made to measure cut down machine 220 volt 3 phase, Billed to: Graber Industires, Inc.

Nine (9) photographs of the Carey–McFall unit of Springs (six rotary cut–down machine "A") that is similar to the Houde concept.

Documents from case of: *Springs Window Fashions LP and Shade–O–Matic Ltd. VS Novo Industries, L.P.*, Memorandum and Order 01–C–400–S, vol. 1 and 2.

* cited by examiner

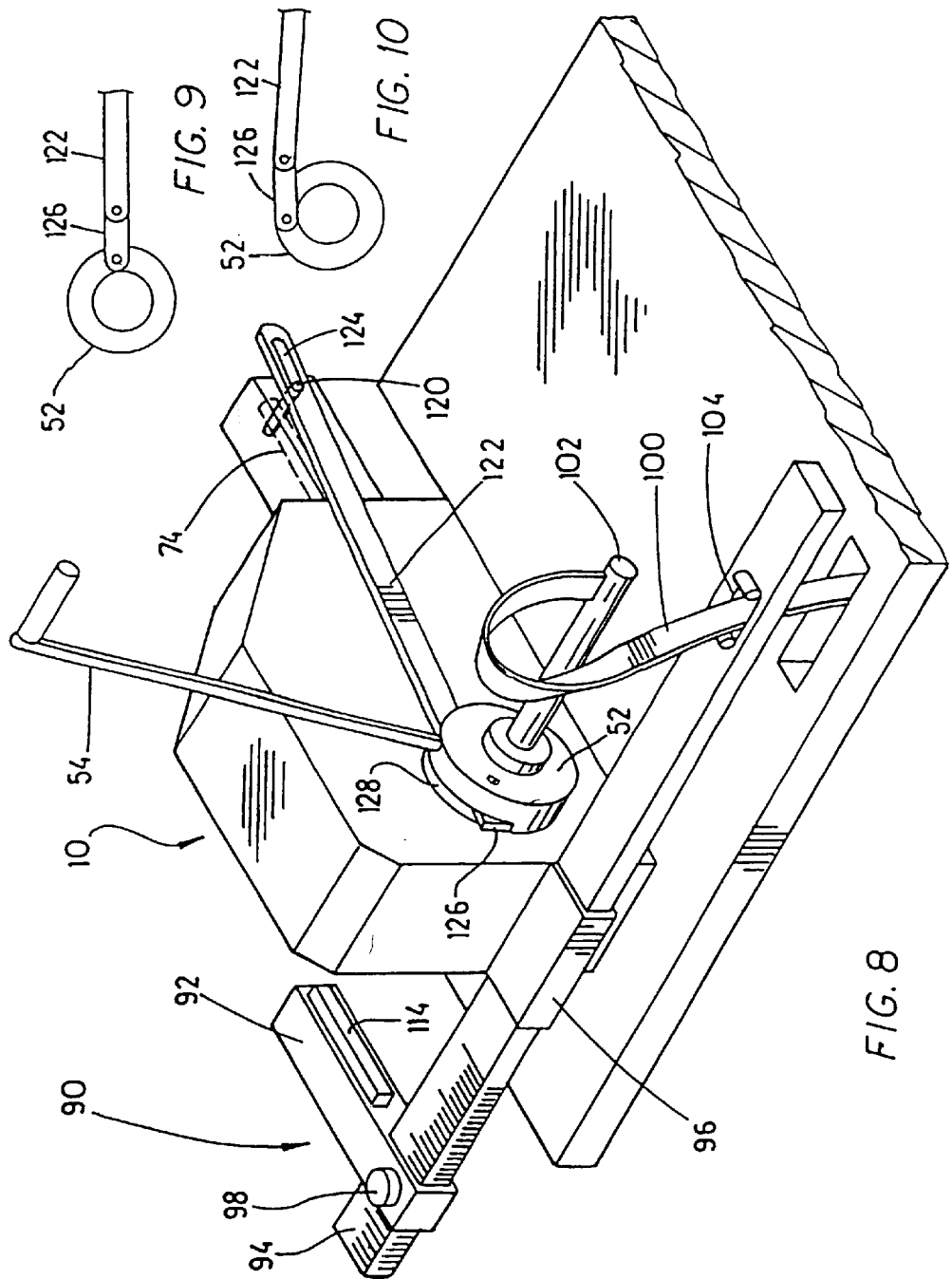

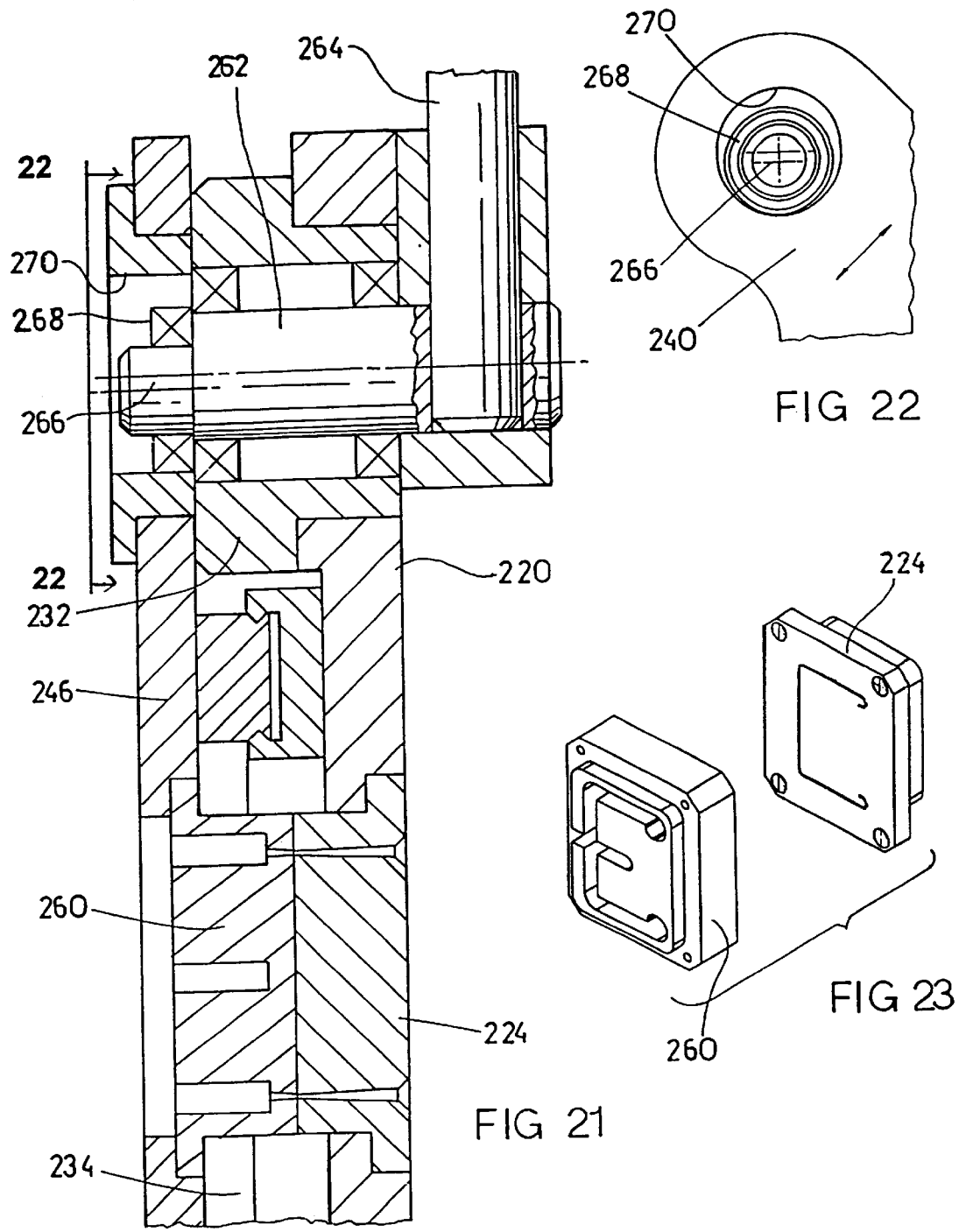

BLIND CUT DOWN APPARATUS

FIELD OF THE INVENTION

The invention relates to an apparatus for cutting of the ends of a blind assembly. This application is a Continuation-in-Part of application Ser. No. 09/414,767, filed Oct. 7, 1999, now abandoned, title: Two Handle Cut Down Apparatus, Inventor: Norbert Marocco, which was a Continuation-in-Part of application Ser. No. 09/132,748 filed Aug. 12, 1998, title: Improved End Trimming Apparatus for Blinds, Inventor: Norbert Marocco, now U.S. Pat. No. 6,196,099 B1, U.S. patent application Ser. No. 09/132, 750, title: Method of End Trimming of Blinds, Inventor: Norbert Marocco, now U.S. Pat. No. 6,178,857 B1 both of which were Continuations-in-Part of application Ser. No. 08/627,015 filed Apr. 3, 1996, title End Trimming Apparatus for Venetian Blinds, Inventor Norbert Marocco, now U.S. Pat. No. 5,806,394, which was in turn a Continuation-in-Part of application Ser. No. 08/526,329 filed Sep. 11, 1995, title End Trimming Apparatus for Venetian Blinds, Inventor Norbert Marocco, now abandoned.

BACKGROUND OF THE INVENTION

Venetian blinds having a headrail and blind slats extending horizontally across a window space are well known. It is well understood that the width of the headrail and the blinds must be suited to more or less match to the width of the window space.

For many years it has been the practice to manufacture venetian blinds on a custom basis. Each blind would be made with the width of the headrail, and the blade width corresponding to the width of a particular window for a particular customer.

This procedure is however relatively expensive. A salesperson is required to attend the customer's house, in most cases, and take a series of measurements. An order is then placed at the factory, and some weeks later the finished blinds are delivered to the customer. Clearly it would be desirable to manufacture a range of venetian blinds, which could be arranged to fit window spaces having a range of widths. However given the limitation of the design, this is simply not possible. In order to partly answer the problems of cost, and delay, of custom made venetian blinds, it would be desirable to manufacture venetian blinds in a range of stock widths, and in a limited range of colors, and stocking these blinds in retail outlets. A customer wishing to purchase a blind or blinds from such an outlet would simply come in with the measurements of the windows of the customer's house. The customer would select those blinds which were as close to the measurements as possible, or only slightly wider.

The retail store would then trim the ends of the blind to the width desired by the customer. The system would mean that the blinds could be manufactured in larger production runs, thus reducing the cost. It would also mean that customers could purchase blinds and take them away from the store almost on a same day basis. There are however certain problems with this procedure.

In particular the design of venetian blinds requires at least two and in some cases more, raise cords, and tilt cords. These cords are arranged at equal distances from each side of the blind. Consequently, trimming the blind to width required trimming each side, by an amount equal to one half of the desired total trim amount, so as to ensure the blind had a satisfactory symmetrical appearance. However, the blind consists of three main different components namely, a headrail, usually of U-shaped metal channel, a bottom rail and set of blind slats, the number depending on the height of the window opening.

In the vast majority of cases the blind slats were formed with a curved cross-section, and the ends of the blind slats were usually cut with a slight bevel or radius, so as to avoid sharp corners at each end of each blind slat.

End trimming operations could not be carried out by simple hand tools. Specialized dies were required for cutting each separate shape, i.e. for cutting the headrail and for cutting the bottom rail and for cutting the slat ends which were of arcuate cross-section with bevelled corners.

Specialized dies and tools have been provided for the purpose, but, it was necessary for each retail store to be carefully trained so as to carry out the three separate cutting operations in a way which produced a blind which was symmetrical down each side.

One minor improvement on the situation was that certain manufacturers provided a cutting die for cutting both the headrail and the bottom rail simultaneously. In this system it was only necessary to provide a separate cut for the blade ends.

Even in this system however, there were possibilities for mistakes, and the operator required considerable skill. The cutting operation was also time consuming.

For all of these reasons, it is clearly desirable to provide an end cutting apparatus for cutting the sides of venetian blinds, in which all three components namely, the headrail, the bottom rail and the blind slats are all cut in a single apparatus. In this way the time required in the retail store for the end cutting operation is reduced. In addition, the skill required is reduced since all three components are in a single plane.

One of the advantageous features in such an apparatus would be the inclusion of an end stop which provided a fixed location, which acted as a stop for all three blind components, once they had been inserted in the appropriate cutting recesses, and in which the end stop would move away from the trimmed off portions of the blinds once the trimming or cutting operation had been completed.

Certain venetian blinds are available having blind slats, and a bottom rail made of material which is wider, in some cases two inches wide. While the headrail, and the blind slats in this type of blind are still made of metal, the bottom rail is frequently made of non-metallic material. This is usually a solid, flat bar which may be for example be formed by extruding thermoplastic materials, or may even be made of wood in some cases, although this is not usual.

In certain types of blinds, it has become the practice to use blind slats of thicker material, than is used in conventional venetian blinds. In these blinds, the thicker blind slat material is formed of extruded thermoplastic material having a thickness and profile which is intended to simulate older style wooden slat blinds. In addition, these blinds have a bottom rail which is also of thicker material.

The cutting of these blind slats presents a somewhat different problem, in that, because they are thicker, it is necessary for the blind slat cutting blade means to travel through a longer cutting path.

In order to accommodate this, it has been found desirable to provide a blind cut down apparatus in which the blind slat cutting means is operated separately from the headrail cutting means. In this way, it is possible to provide a much longer cutting stroke than is required to cut down the headrail itself.

Due to the nature of the thicker blind slat material in this type of blind, this does not create a problem of requiring extra manual force. Although the head rails in this type of blind are made of roll-formed metal channel in most cases, the cutting of such head rails is well within the capacity of the apparatus, since the headrail cutting die is required to move only a relatively short distance, ie. a distance equal of approximately the thickness of the sheet metal material.

On the other hand, the blind slat cutting means is required to move a through a much greater cutting path. This, however, is not a problem since the blind slat material in this type of blind is much softer, and does not require so much cutting force.

BRIEF SUMMARY OF THE INVENTION

With a view to providing a more adaptable blind slat cutter machine, suitable for cutting a variety of different blinds, the invention provides an apparatus for trimming the width of blinds of the type having a plurality of components including a headrail, and a bottom rail, and a plurality of blind slats, each having a predetermined arcuate profile, and comprising support body means, said body means defining a headrail opening, and a bottom rail opening, and means defining blind slat opening means being aligned along a horizontal axis, respective said blind components being insertable into respective said openings; headrail die plate means located alongside said support body a headrail cutting recess in said die plate means for cutting said headrail; bottom rail and slat cutter means for cutting the bottom rail and said blind slats; guide means on said support body for movably supporting said die plate means, said guide means defining a predetermined movement axis, whereby said die plate can move relative to said headrail opening in said support body between two positions, a first position in which said support body opening and said die plate cutting recess are in alignment with one another, and a second position in which said cutting recess is out of alignment with said opening, first means for moving said bottom rail and blind slat cutter means to cut said bottom rail and said blind slats, and, second means for moving said die plate means, between said two die plate positions.

The invention further provides such a blind slat cutter apparatus wherein said headrail opening, and said bottom rail opening in said support body and said blind slat opening means, are aligned along a common axis, and wherein said headrail cutting recess, and said bottom rail cutting recess and said blind slat cutting means are also aligned along a common axis.

The invention further provides such a blind slat cutter apparatus wherein both said axes are coincident and are horizontal, whereby to facilitate insertion of respective said blind components in respective said openings and recesses and passages.

The invention further provides such a blind slat cutter apparatus wherein said die plate movement axis is substantially diagonal to said axes of said headrail and said bottom rail and blind slat openings and respective said recesses.

The invention further provides such a blind slat cutter apparatus wherein said bottom rail and said blind slat cutter means are slidably mounted on said support body, and being movable relative to said bottom rail opening and to said blind slat opening means, whereby to cut said blind slats, upon movement of said bottom rail and said cutting means.

The invention further provides such a blind slat cutter apparatus including blind slat support means defining a predetermined arcuate profile, and mounted on said support body and wherein said blind slat cutter means has blade means defining a corresponding predetermined profile, whereby said blind slats are trimmed in accordance with said predetermined profile.

The invention further provides such a blind slat cutter apparatus including partition means in said blind slat opening means for separating said blind slats into groups whereby said groups of blind slats are cut in sequence, upon movement of said blind slat cutter means.

The invention further provides such a blind slat cutter apparatus wherein said means for moving said die plate means comprises a manually operable lever means, mounted in said support body, and transmission means connecting said lever means with said die plate means for transmitting movement of said manual lever means thereto and including a blind slat cutter rod connected to said manual lever means and operable to cause movement of said blind slat cutter means.

The invention further provides such a blind slat cutter apparatus including end stop means adjacent said die plate means, for engaging the free ends of said blind components, whereby to define a predetermined length of cut in respect thereof, linkage plate means connected to said end stop means and movement pin means connected to said linkage plate and responsive to movement of said blind slat cutter means, whereby to move said end stop means free of said die plate means and free of said bottom rail and blind slat cutter means for clearing of trim portions of said blind.

The invention further provides such a blind slat cutter apparatus wherein said blind slat opening means is located between said headrail opening and said bottom rail opening in said support body whereby to facilitate insertion of said blind components into said support body and said die plate means.

The invention also provides that the blind slat and bottom rail cutter means shall comprise a moveable cutter blade support, and a plurality of cutter blades carried by said cutter blade support, and wherein second movement means is coupled to said cutter blade support, and is operable to move such cutter blade support along a predetermined cutting travel path.

The various features of novelty which characterize the invention are pointed out with more particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

IN THE DRAWINGS

FIG. 1A is a perspective of a typical venetian blind;

FIG. 8 is a perspective view in schematic form of an end stop mechanism;

FIG. 9 is a side view of another slat cutting drive linkage in one position;

FIG. 10 is a side view corresponding to FIG. 9, in another position;

FIG. 21 is a section along the line 21—21 of FIG. 18;

FIG. 22 is a section along the line 22—22 of FIG. 21;

FIG. 23 is an exploded perspective illustration showing a head rail opening portion and a head rail cutter opening in a cutter blade portion;

DESCRIPTION OF A SPECIFIC EMBODIMENT

Figure 1:
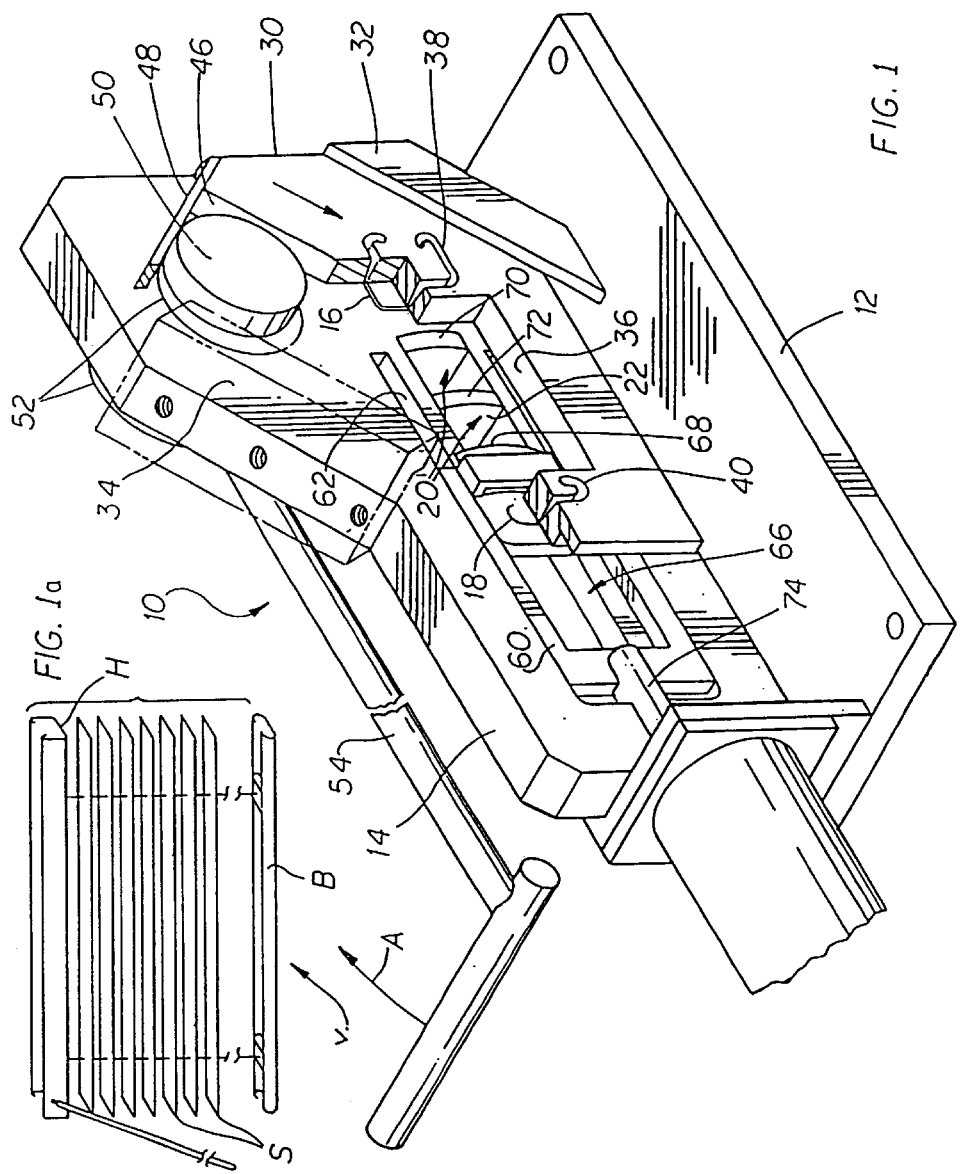
FIG. 1 is a perspective illustration of a blind cutting apparatus illustrating one embodiment of the invention, partially cut away.

Referring generally to FIG. 1, it will be seen that one embodiment of the invention is there illustrated in the form of a blind end trimming apparatus indicated generally as 10 in this case being designed for trimming venetian blinds. Typically the apparatus may be mounted on any suitable form of work table or bench (not shown) which may function both to support the apparatus 10 at a suitable working height, and which may also have suitable supports and guides for holding the venetian blind itself during cutting.

A typical venetian blind V is shown in FIG. 1A and has various components including a headrail H a bottom rail B and blind slats S.

As explained, it is desirable to provide for cutting of all three blind components namely the headrail, the bottom rail, and also the blind slats themselves, all cuts being made in the same plane, preferably without moving the blind between cuts, so as to ensure that when trimmed, each side edge of the blind presents a symmetrical even appearance.

The end trimming apparatus 10 will be seen in this embodiment to comprise a base plate 12, and a main support body 14 attached to the plate 12 in a generally upright fashion normal to the plate 12.

The main support body 14 is formed with a headrail opening 16, a bottom rail opening 18, and a plurality (two) of blind slat openings 20—20, spaced apart by a central partition 22.

The headrail opening, the blind slat openings, and the bottom rail opening, are aligned side by side horizontally with one another, and are spaced in such a way that venetian blinds having a relatively wide range of numbers of blind slats, can readily be positioned with their respective headrails, blind slats, and bottom rail in the appropriate openings.

The headrail opening 16 is of rectangular shape in this case, shaped to correspond with the shape of a typical headrail.

The bottom rail opening 18 is likewise shaped to receive a typical bottom rail.

It will be appreciated that blind manufacturers use headrails and bottom rails of varying different designs and shapes, so that any one manufacturer may wish to build an end trimming device suited for its particular blinds only, and not being suited to receive blinds of competitors. Similarly, if such a manufacturer produces blinds having various headrails, bottom rails, and blind slats of various different dimensions and or shapes and profiles, then the manufacturer will supply to its retail outlet a variety of different end trimming apparatus, so that each retailer can trim a range of different venetian blind designs supplied by that manufacturer.

While the apparatus shown and described so far will suit only one shape of headrail, bottom rail, and blind slat, it is conceivable that such apparatus could be made with interchangeable recesses, and dies and cutters so that it could be adapted to trim the ends of variety of different venetian blind designs, simply by interchanging certain components.

This however is not illustrated herein, and it is believed that it will be obvious to persons skilled in the art as to how this could be achieved.

As explained, the headrail opening, the slat openings, and the bottom rail opening are arranged spaced apart horizontally so that a complete blind consisting of headrail, slats, and bottom rail, may be received with their components in their respective openings. The blind slats can be arranged in bundles and slid through into the two openings provided, in whatever arrangement is most suitable for that particular blind.

As mentioned the entire trimming apparatus 10 is advantageously mounted on a bench, (not shown) with clear space to one side of the main support body member 14, so that the rest of the blind can be supported during trimming. This supporting function may be provided in some cases by one or more rails with guides, but can also simply be provided by a bench or table, at a suitable height.

HEADRAIL AND BOTTOM RAIL TRIMMING

The apparatus for trimming the headrail and the bottom rail consists of a die plate 30, which is slidably mounted on one side of the main support body 14 by means of lower guide 32 and upper guide 34.

The two guides are parallel to one another, and are spaced apart and extend along parallel diagonal axes at about 45°. The die plate 30 is thus slidable within the guide rails along a diagonal upward and downward movement path. Other movement paths such as arcuate, vertical or otherwise would also serve the purpose. in order to avoid any cutting of the blind slats, by means of the die plate 30, a central rectangular clearance opening 36 is provided in the die plate, registering with the slat openings 20 in the main body 14.

In order to cut the headrail, a headrail cutting recess 38 is provided in die plate 30. When the die plate is in one position, the cutting recess 38 is adapted to register with the headrail opening 16 in the support body 14.

When the die plate 30 is moved into the other position, a cutting action takes place, and the opening and the recess are out of registration with one another.

The bottom rail cutting is effected by means of a bottom rail cutting recess 40 formed in die plate 30, and adapted to register with the bottom rail opening 18 in support body 14 in one position, and to be out of registration in another position.

Thus movement of the die plate 30 between one position and another position, once the headrail and the bottom rail have been inserted into respective openings and recesses, will produce cutting or trimming of the ends of both the headrail and the bottom rail which may be simultaneous, or almost at the same time, or in sequence depending upon the design (see below), and in the same plane.

At this point it should be noted that the orientation of the headrail openings and the bottom rail openings both in the main body 14 and the die plate 30 are such that the headrail and bottom rail are substantially lying on edge, in planes parallel to one another but spaced apart, with the blind slats between them.

It will however be observed that in this embodiment the direction of the cutting angle is diagonal to the position in which the headrail and the bottom rail are lying. In this way, the cutting action of the die plate, when it commences movement, takes place initially by applying cutting pressure to one corner of each of the headrail and the bottom rail, and cutting is thus progressive through the two components in a diagonal manner while the two components are held fixed substantially on edge. Other cutting configurations can be used as will be explained below.

This feature advantageously reduces the total force that must be applied to achieve cutting, and so permits the cutting operation to be performed by manual means. Of course it is possible that the entire operation can be power operated as will become apparent below, although it is believed that this would unnecessarily increase the cost of the apparatus.

Figure 11:
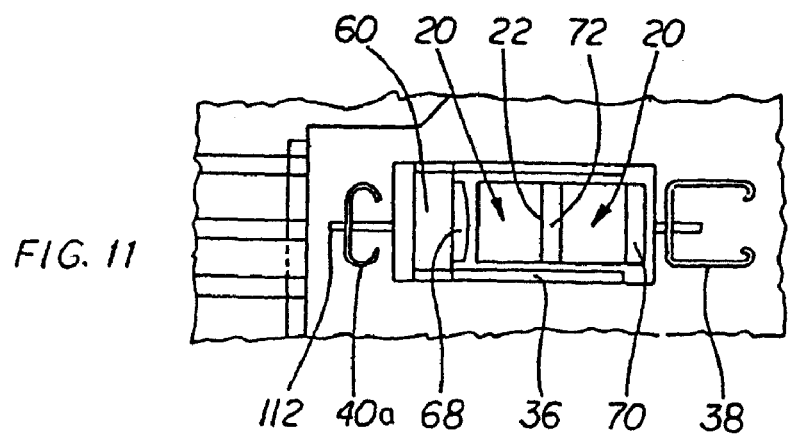
FIG. 11 is a partial side elevation of an alternate embodiment.

For example, cutting of the two components could take place in sequence. The bottom rail die recess 40 could be slightly oversized as at 40A in FIG. 11, so that cutting of the bottom rail would take place just after cutting of the head rail, to further reduce manual effort.

In order to apply manual cuffing force to the die plate 30, the die plate 30 is formed with a rectangular recess 42 having a bottom edge 44, normal to the diagonal axis of the die plate, and two side edges 46—46. A top closure bar 48 closes off the rectangular recess 42 for reasons to be described below.

In order to move the die plate 30, a driver mechanism is provided which in this embodiment comprises, a rotary cam member 50 is provided, which is adapted to engage the bottom edge 44 of the recess 42, for movement of plate 30 in one direction, and closure bar 48 closing the recess 42, for movement in the other direction.

The two side edges 46 do not contact the rotary cam, but define clear spaces on either side to permit arcuate movement of cam 50.

The cam 50 is itself mounted eccentrically on a drive hub 52, which is rotatably mounted in the main body 14. Drive hub 52 extends outwardly from the main body 14 (FIG. 1), and is provided with a manual operating lever 54.

The rotary axis of the cam 50 is offset relative to the rotary axis of the drive hub 52. Thus when the drive hub 52 is rotated by manually pulling the lever 54 in the direction indicated by the arrow A, the cam 50 will be forced against the lower edge 44 of the rectangular recess 42 in the die plate 30. This will force the die plate 30 to move on a downward diagonal axis, thereby cutting both the headrail H and the bottom rail B of the blind. Releasing the handle 54 permits a spring (not shown) to return the handle and rotate the drive hub in the opposite direction, and this will cause the rotary cam to engage the closure bar 48 and cause upward diagonal movement of the die plate 30.

TRIMMING OF BLIND SLATS

The trimming of the blind slats S is carried out in this embodiment as a separate function from the trimming of the headrail and the bottom rail.

For this purpose in this embodiment, a blade mounting frame 60 is slidably mounted on main body 14, between main body 14 and the die plate 30. Main body 14 is formed with two guide grooves 62, and the blade mounting frame 60 is supplied with two guide bars 64, sliding in the grooves 62. This arrangement is for purposes of illustration only.

Figures 4, 5:
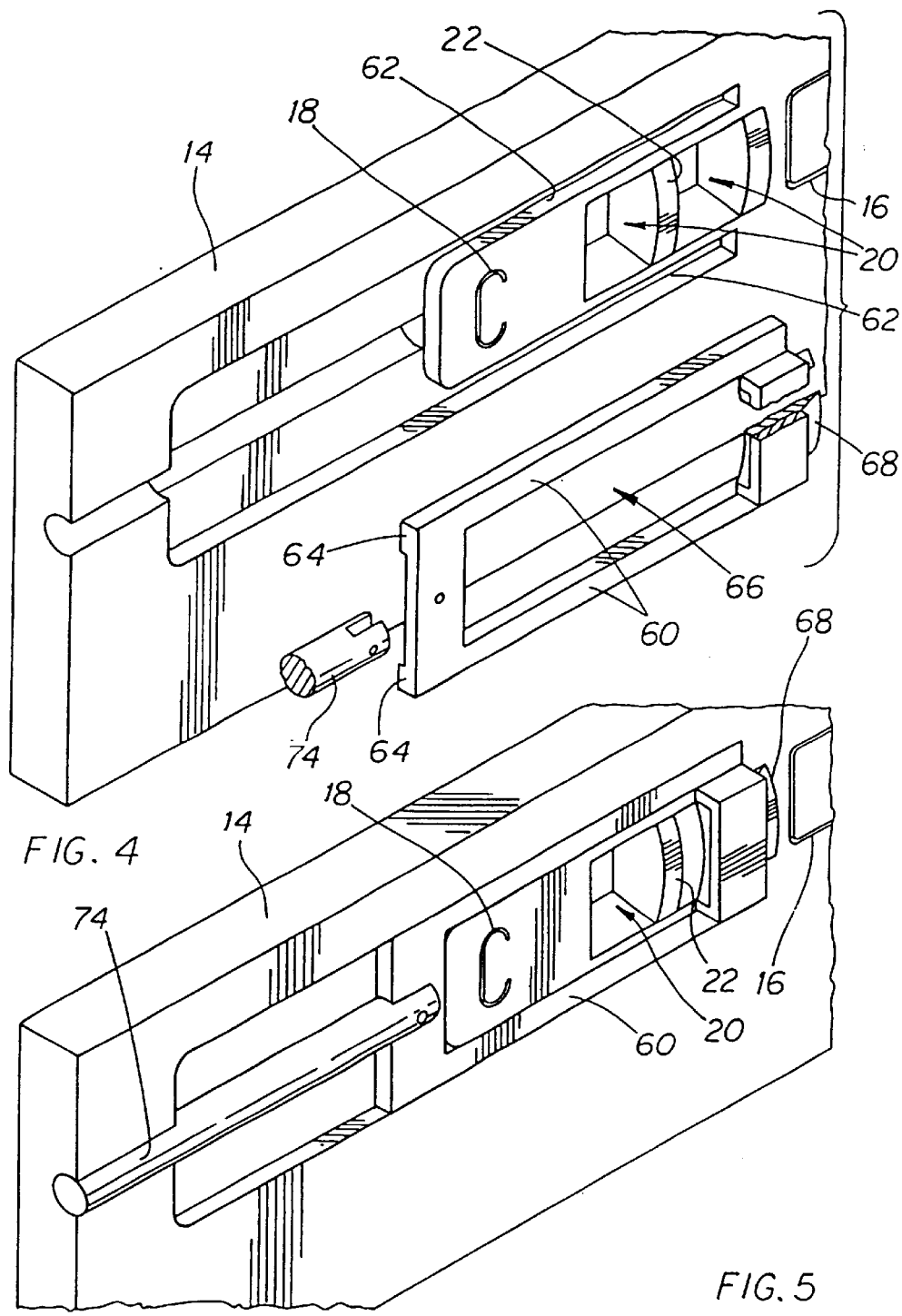
FIG. 4 is an exploded perspective illustration of certain components of the cutting apparatus, with other components removed.
FIG. 5 is a perspective illustration corresponding to FIG. 4 showing the parts assembled.
Figure 6:
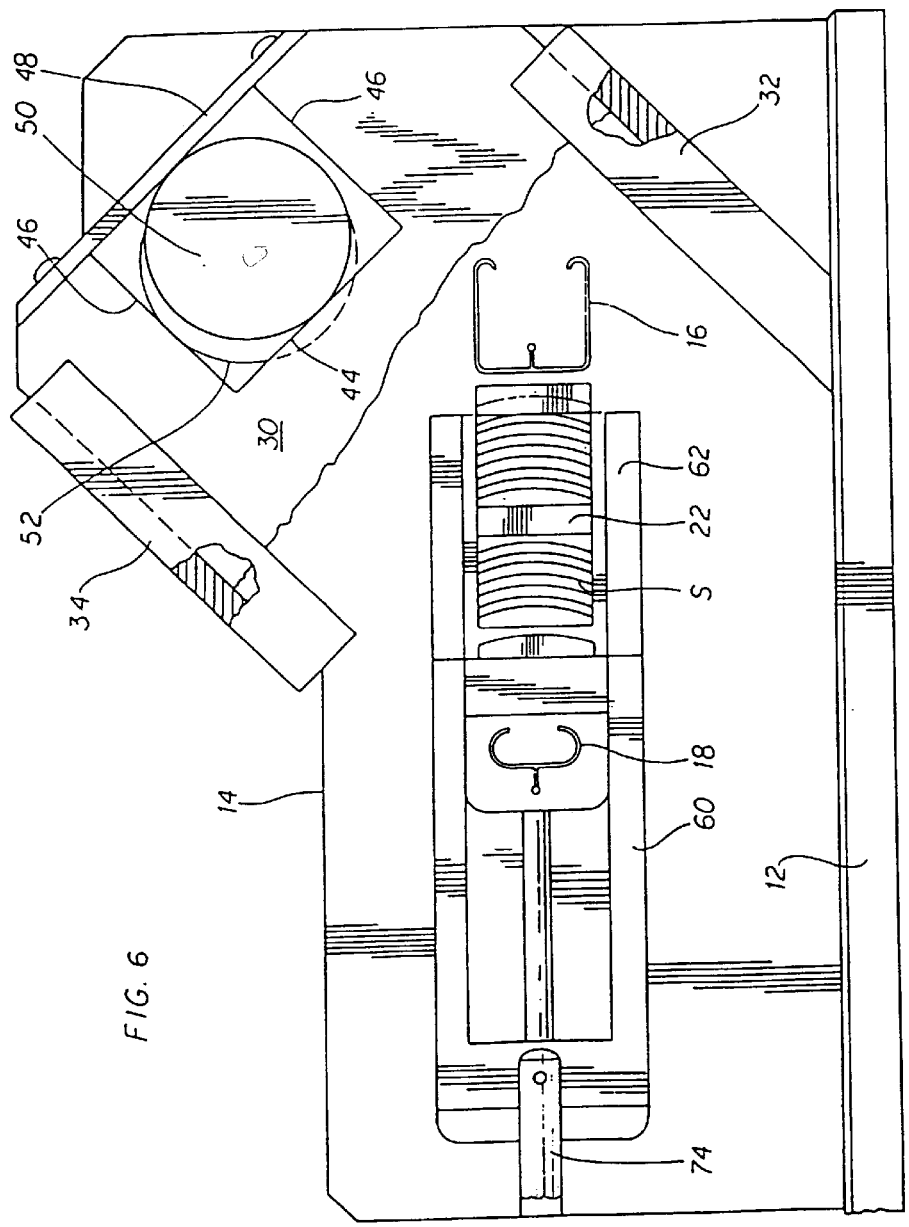
FIG. 6 is an enlarged side elevation of the portions of the apparatus shown in FIGS. 4 and 5.

The blade mounting frame 60 is of rectangular shape and defines an interior space 66. At one end (right hand end of FIGS. 4 and 5) a blade 68 is mounted on the frame 60. The blade is a generally curved shape in end section, so as to provide a generally bevelled trim shape to the ends of the blind slats S. However, the blade 68 can have any shape desired for a particular slat design.

Generally curved blind slat supports 70 and 72 are provided on main body 14, and on partition 22 respectively. In this way, movement of the blade 68 will shear the ends of the slats S, against the support of the arcuate slat supports 70 and 72, thereby providing a clean cut on each slat end. The centre portion of the blade 68 moves in the same plane as the interior surface of the die plate 30. In this way the ends of all the blind components are trimmed in an even and symmetrical manner.

In order to move the blade support frame 60 to and fro, a driver mechanism is provided which in this embodiment comprises, a connecting rod 74 is secured to the free end (left hand in FIGS. 4 and 5), of frame 60.

Figure 7:
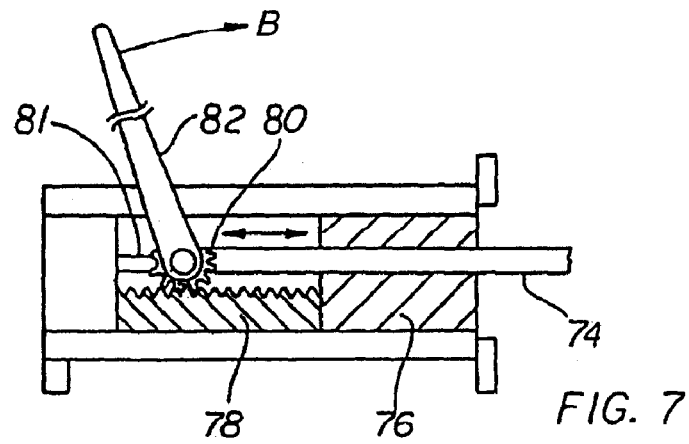
FIG. 7 is a side elevation or illustration of a manual mechanism for operating the slat cut-off apparatus.

Connecting rod 74 may be powered by any suitable means. Preferably, in accordance with this preferred embodiment of the invention, the connecting rod 74 will be powered manually. For this purpose connecting rod 74 is connected through a support block 76 to a rack 78 (FIG. 7), and a drive gear 80. Drive gear 80 is connected to a manually operable lever 82 and moves to and fro in slots 81. Swinging of the lever 82 in the direction of the arrow B will cause the connecting rod 74 to drive the blade mounting frame 60 to the right (FIG. 7) and reverse movement will cause reverse movement of the mounting frame 60.

In this way the slat ends may be trimmed in a single manual movement. It will of course be appreciated that the rack and pinion manual operation may be replaced by any other manual linkage or arrangement or by any suitable power operated means such as a power cylinder or the like. However such substitutions are deemed relatively straightforward for persons skilled in the art.

While in this embodiment the blind slat cutting assembly is incorporated in the trimming apparatus 10, it will also be appreciated that the blind slat openings 20 and supports 70 and 72 could be mad separately and could form part of a separate apparatus, with the frame 60 and blade 68 associated with them, so as to be separate from body 14 and from openings 16 and 18, and die plate 30.

END STOP ASSEMBLY

In order to assist in the use of the apparatus and ensure that the correct amount is trimmed off each end of each blind, an adjustable end stop assembly 90 is provided as shown in FIG. 8. This will be seen to comprise a stop arm 92, mounted on a slide bar 94. The slide bar 94 is slidable in a slide block 96, mounted on device 10.

An adjustable fastening screw 98 is provided on arm 92, and suitable indicia may be provided along the bar 94 so that arm may be adjusted to the correct position.

The slide bar 94 is slidable within block 96. It is operated by means of a curved linkage bar assembly 100. One end of the linkage bar assembly is secured to an axle rod 102 extending from drive hub 52.

A particular length of trim may be selected and the stop arm 92 may be moved to that length and secured by fastening screw 98.

The linkage bar 100 extends through opening 104 in bar 94, so that when bar 100 moves downwardly, bar 94 is driven to the left (FIG. 8), and vice versa.

In operation, when a trim cut has been commenced at one end of the blind, the linkage bar 100 moves down through opening 104, thereby moving the stop arm 92 away from the die plate 30. The loose ends or cut off ends of the blind may then be removed, after which the arm 54 may be returned once more bringing the stop arm 92 into the stop position.

Figure 2:
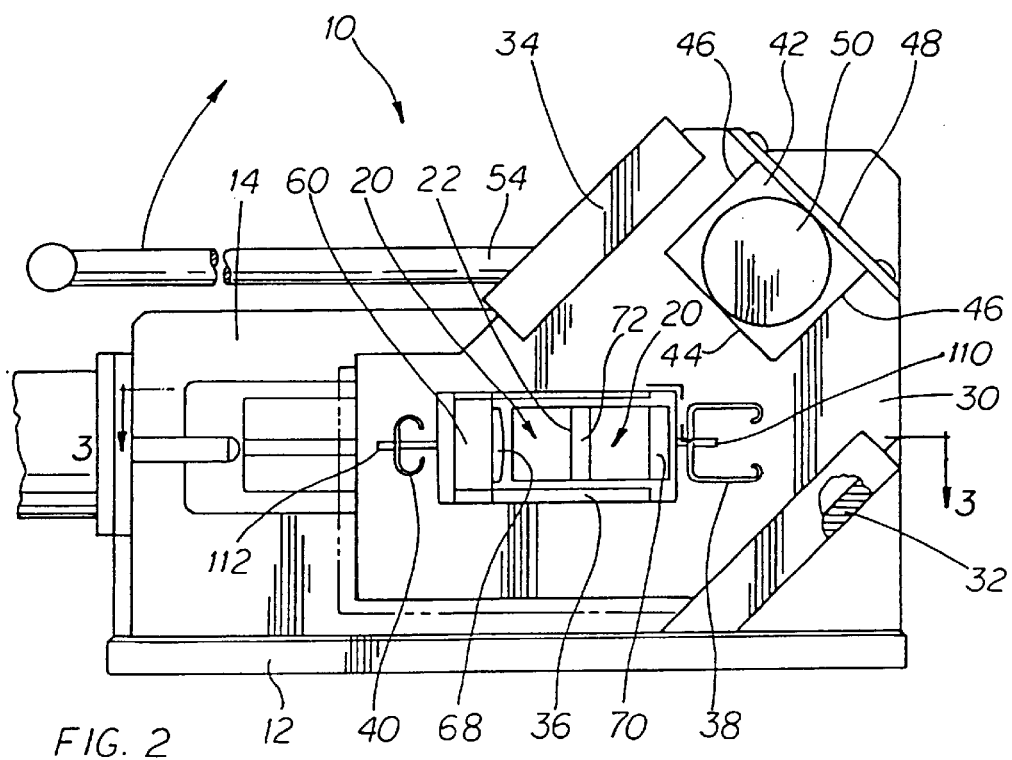
FIG. 2 is a side elevation of the apparatus of FIG. 1, with movement shown in phantom.
Figure 3:
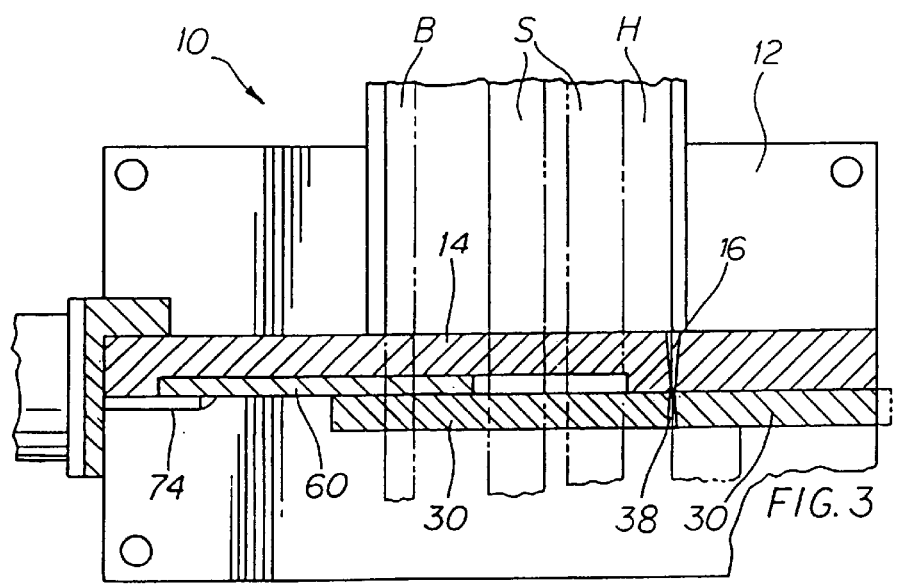
FIG. 3 is a section along the line 3—3 of FIG. 2.

In certain cases, it may be found that the thickness of the die plate 30 is greater than the length of the trim portion which is desired to cut off from one end of the blind. To overcome this problem, the die plate may be provided with slotted recesses 110 and 112 (FIG. 2), extending more or less horizontally and aligned with one another, from the headrail cut off recess 38 and the bottom rail cut off recess 40.

The end stop arm in this case may be made sufficiently thin as at 114 that it will fit within the slots 110 and 112 and thus extend completely across the die plate 30 from the headrail cut off recess 38 to the bottom rail cut off recess 40. This will then permit the operator to set the stop arm 92 at the appropriate position, to provide an end trim of the blind, having a length which is shorter than the thickness of the die plate itself.

As also illustrated in FIGS. 8, and 9 and 10, it is possible to provide for operation of the blind slat cutting blade, in synchronism with the operation of the die plate for cutting the headrail and bottom rail. This may be achieved, by means of connecting the drive shaft 74 driving the blade assembly, by means of a cross bolt 120, to a lost motion linkage 122. Lost motion linkage 122 has a slotted opening 124 to receive bolt 120, thereby allowing the linkage 122 to move a predetermined distance, before it engages bolt 120.

The other end of linkage 122 is connected (FIGS. 9 and 10) to a connecting link 126. Connecting link 126 is connected within a slotted recess 128 in drive hub 52.

In this way when the arm 54 is swung toward the operator to rotate drive hub 52, so as to cut the headrail and bottom rail, a predetermined distance, swinging of the arm 54 a further distance will cause movement of the bolt 120, and connecting rod 74 thereby causing movement of the blade assembly for shearing the ends of the blind slats.

In this way a single manual movement can provide for cutting of all three components of a blind.

Figure 12:
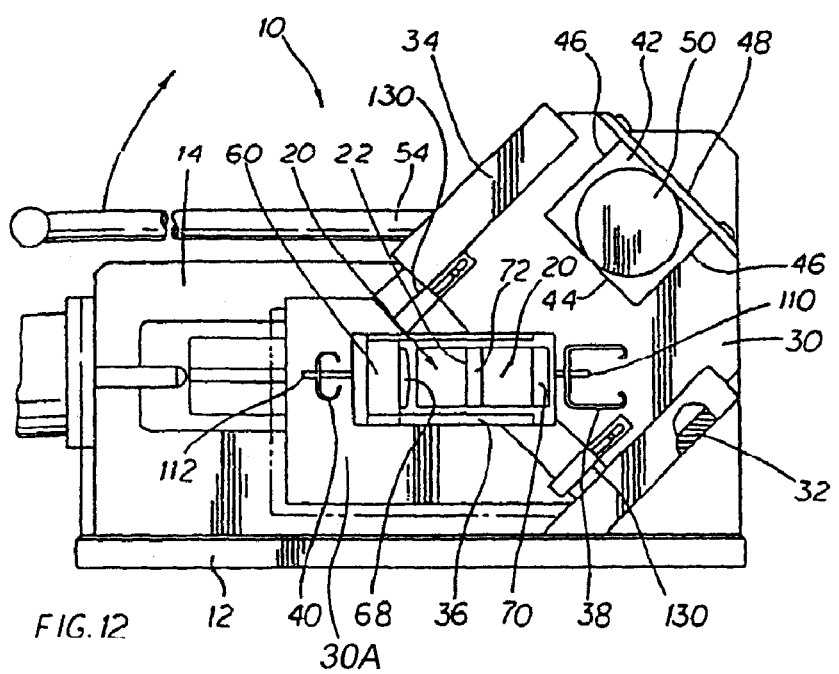
FIG. 12 shows a further embodiment.

As explained on Page 12 it may be desirable to provide that cutting of the headrail takes place first, and the bottom rail is cut in sequence. This can also be achieved as shown in FIG. 12. The die plate 30 can have a separate portion 30A, and lost motion links 130 connect it with die plate 30. This would achieve cutting of the two components in sequence.

Cutting of the headrail and bottom rail may take place in various orientations and directions. The FIG. 1 embodiment illustrates a diagonal cutting orientation.

Figure 13:
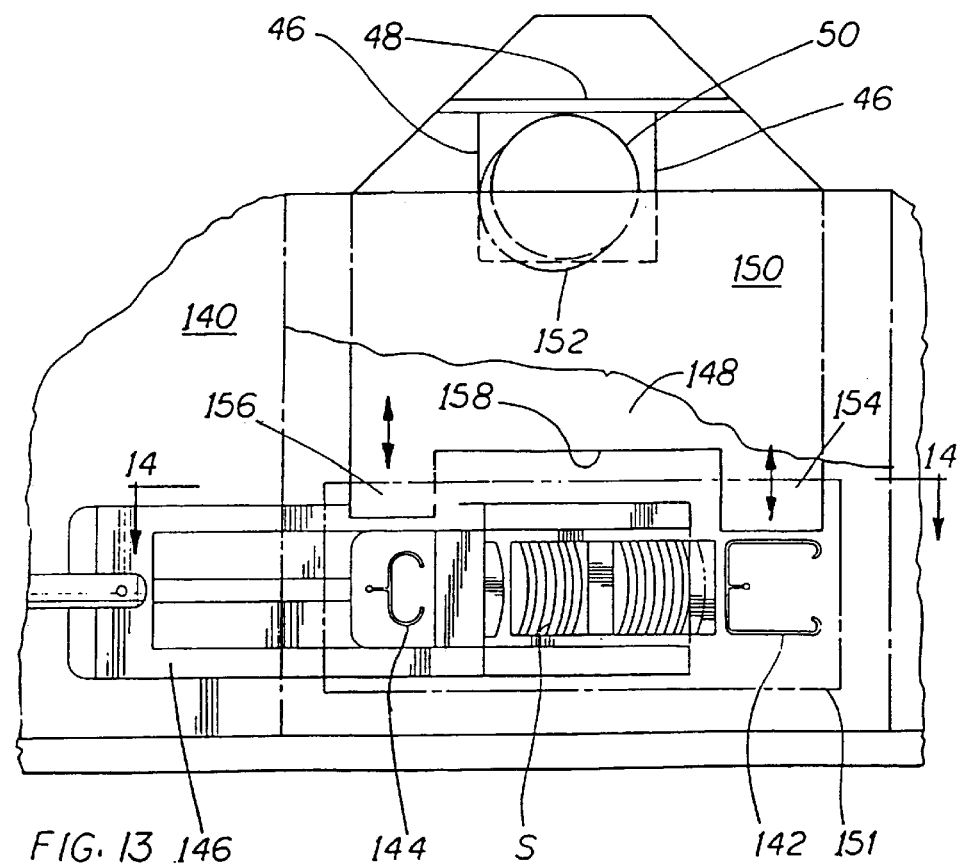
FIG. 13 shows a further embodiment for vertical cutting.
Figure 14:
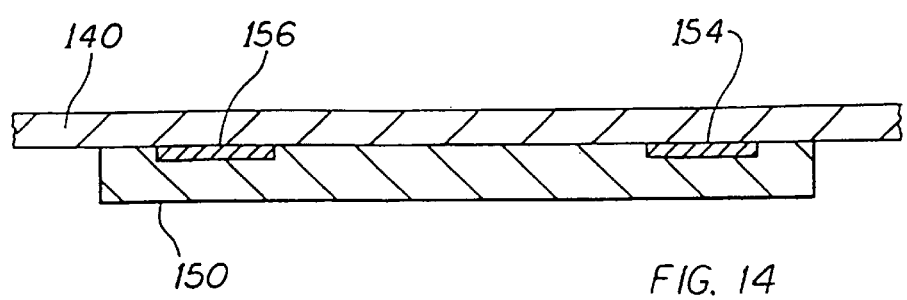
FIG. 14 is a section along line 14—14 of FIG. 13.

However cutting could equally well take place in various other orientations. FIG. 13 for example illustrates cutting in a vertical orientation. In this case a main body 140 having headrail and bottom rail openings 142 and 144 as provided, similar to FIG. 1 embodiment. A transverse blind slat cutting assembly 146 generally similar to the FIG. 1 embodiment is also provided. However in order to shear the headrail and bottom rail, a vertical shear member 148 is provided, mounted in a transverse guide plate 150. A drive cam 152 is mounted to a rotatable drive hub (not shown) and drives the shear 148 in manner similar to the die cutting plate of FIG. 1. In this case, however the movement is vertically, downwardly, and upwardly.

Plate 150 would have an opening 151 to receive the ends of the blind components.

A headrail shear blade 154 is provided is provided on one side of the shear member 148 and a bottom rail shear blade 156 is provided on the other side registering with the respective headrail and bottom rail openings 142 and 144. Between the two shear blades there is a rectangular clearance space 158, the purposes of which is to fit around either side of the blind slat portion S, extending through the main body 140.

It will also be seen that in this embodiment, by the operation of the cam 152 the entire shear member 148 will be driven downwardly. This will cause the two shear blades 154 and 156 to cut the headrail and the bottom rail. After this, the shear member 148 will be raised upwardly, and cutting of the blind slats S can then proceed in the manner already described above.

It will of course be appreciated that the illustration of two cutting orientations namely diagonal, and vertical, is merely for the sake of illustration and without limitation to the scope of the invention. The invention is deemed to comprehend all such cutting orientations as may produce the desired result.

Figure 15:
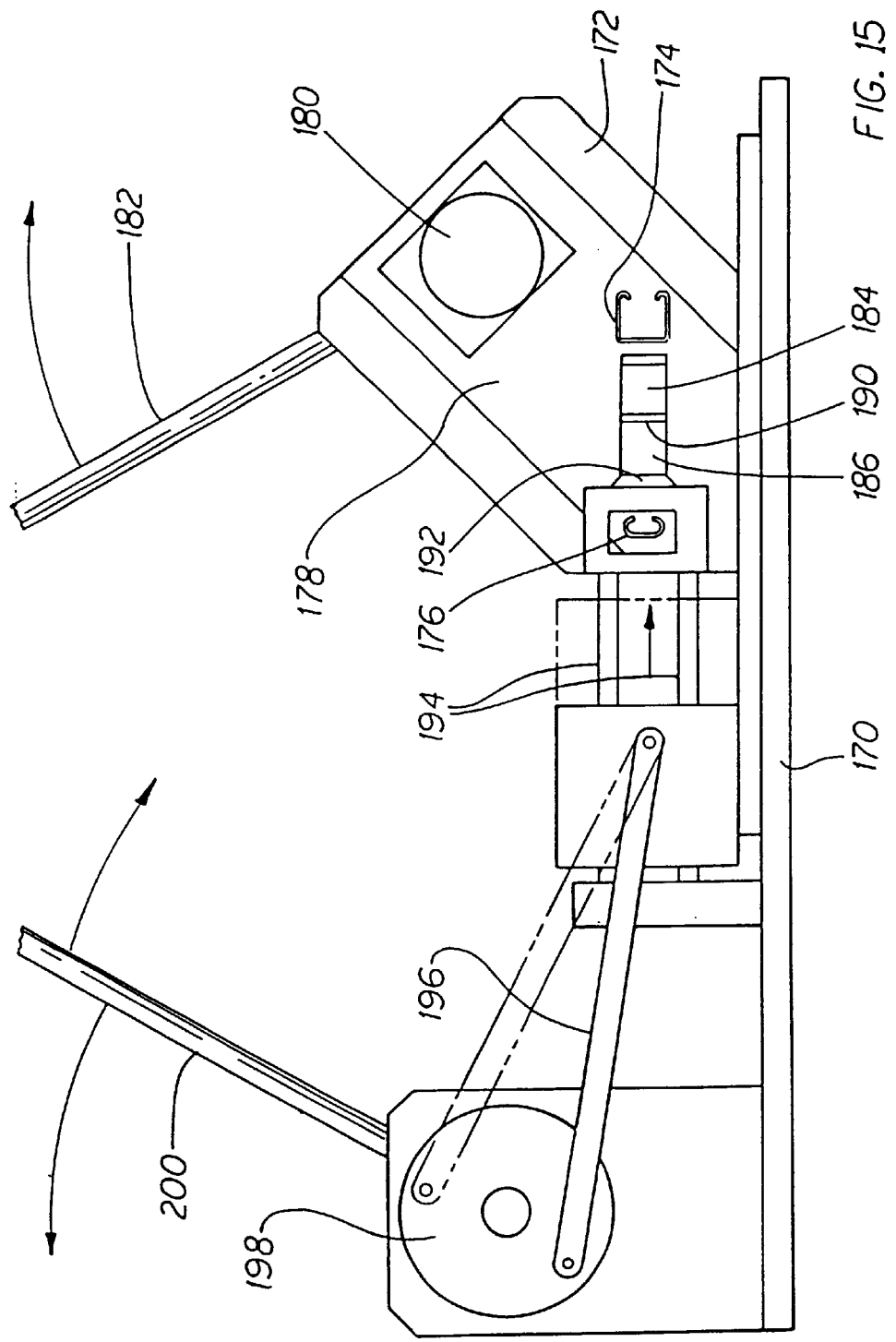
FIG. 15 is a schematic illustration of a further alternate embodiment of the invention.

As illustrated in FIG. 15, the invention may also be carried out using two separate manual controls, for cutting various of the blind components separately by separate manual operations.

In this case, a base plate 170 is shown fitted with a blind component holder member 172. Holder member 172 has a generally rectangular slotted opening 174 to receive the headrail of the blind, and a generally C-shaped opening 176 to receive the bottom rail of the blind. A cutting die plate 178 may be provided, in this case of a similar design to that illustrated in the FIG. 1 embodiment. It will also have suitable cutting openings (not shown) registering with the headrail opening 174 and the bottom rail opening 176, for cutting the headrail and the bottom rail. It may be operated by a cam 180 and an arm 182.

In this way, the headrail and the bottom rail of the blind may be cut either simultaneously or in sequence (as described above) by operation of the manual arm 172.

The blind slats in this embodiment would be supported in the blind slat openings 184, 186, separated by the supporting partition 190. This enables the blind slats to be arranged in the two openings 184,186, so that they will not all be bunched while they are being cut, but may be grouped in separate bundles, for reasons described above.

A cutting blade 192, for cutting the blind slats, would be operated by means of rods 194 and 196, and wheel 198 and handle 200.

In this way, the cutting of the headrail and the bottom rail is achieved by one manual operation, and the cutting of the blind slats is achieved by another manual operation.

In some circumstances it is also desirable to be able to trim the width of a vertical blind. Typical vertical blinds have a headrail with control rods extending the length of the headrail. Runners within the headrail support a plurality of vertical slats in known manner.

In some cases at a point of sale a customer may require that the vertical blind be trimmed as to width.

Figure 16:
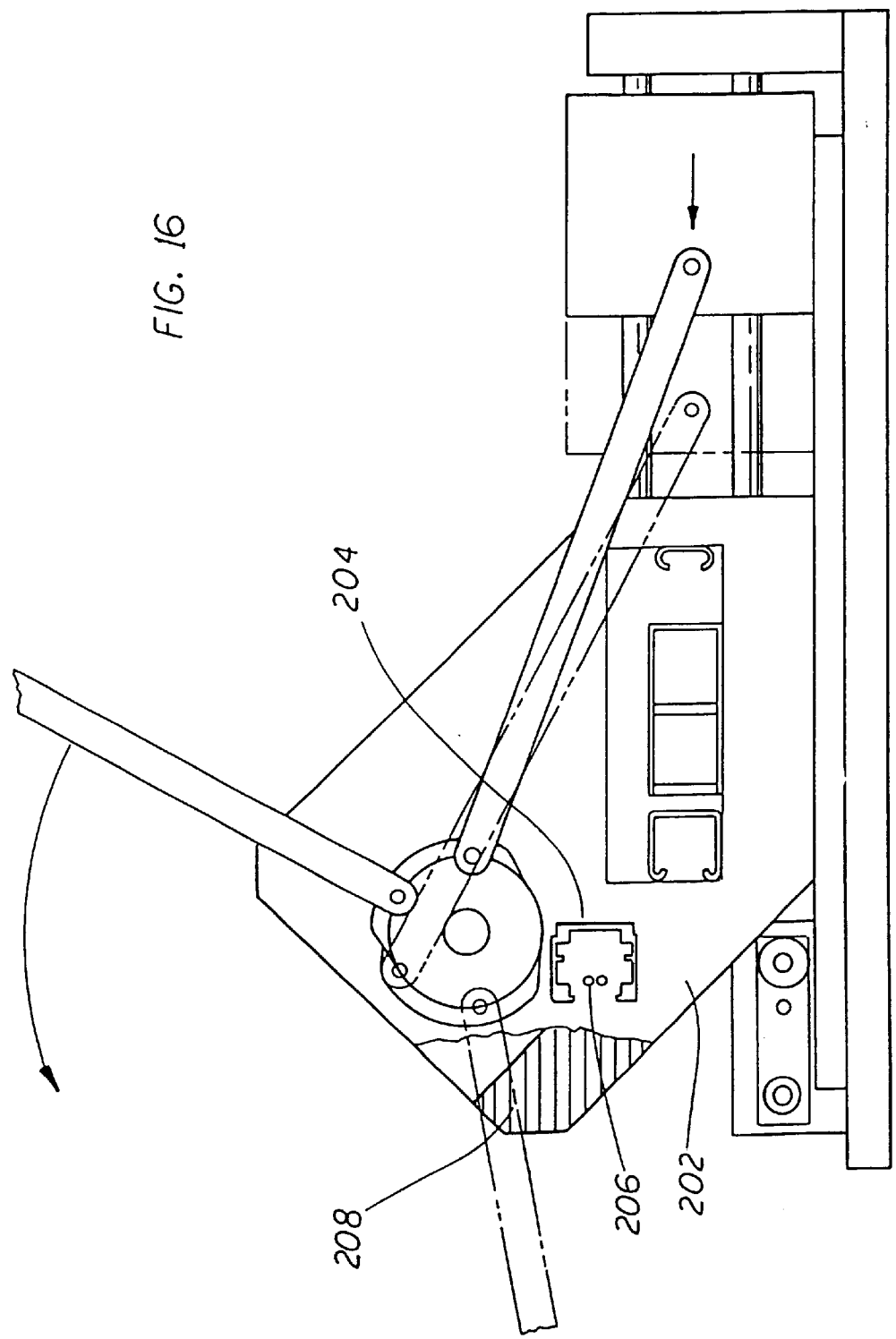
FIG. 16 is a side elevation of a cutter for trimming a vertical blind.

This can be achieved by the modification shown in FIG. 16.

In this case the support body 202 is formed with a further generally U-shaped recess 204 which is shaped to receive the headrail of a vertical blind. Head rail and control rod holes 206—206 are formed side by side, within the space enclosed by the headrail recess 204. The cutting die plate 208, located on the other side of body 202, is provided with a matching cutting opening (not shown) and cutting holes (not shown) for cutting the vertical blind headrail rods and control rods.

Depending on the length of the headrail that is cut off, one or more runners and vertical blind slats (not shown) will also be removed by simply sliding them out of the open end of the headrail.

The above-noted apparatus is satisfactory for cutting blinds typically having a blind slat width of around one inch or so, and also for trimming vertical slat blinds.

However, there also exist blinds of a somewhat different type having slats of a greater width, typically in the region two inches. Blinds of this type may be fabricated of somewhat different material and may be shaped somewhat differently. In particular the bottom slat or rail may be of solid material and formed with flat planar sides.

Thus while the modified form of two inch blind may have an appearance generally similar to that shown in FIG. 1A, the bottom rail B is a solid member, typically formed of extruded thermo plastic material or the like, and the blind slats themselves may well typically be formed of thin metallic strip material similar to the one inch blinds but simply wider. The top rail is again of typically rectangular channel shape in section but will typically be approximately two inches wide rather than one inch wide as in the case of the smaller blinds.

When cutting this type of modified blind therefore because the bottom rail B is made of a somewhat softer material, and has simply a flat planar section (FIG. 18) it is possible to perform the cutting operation of the bottom rail B more or less simultaneously with the cutting of the blind slats themselves.

Figure 17:
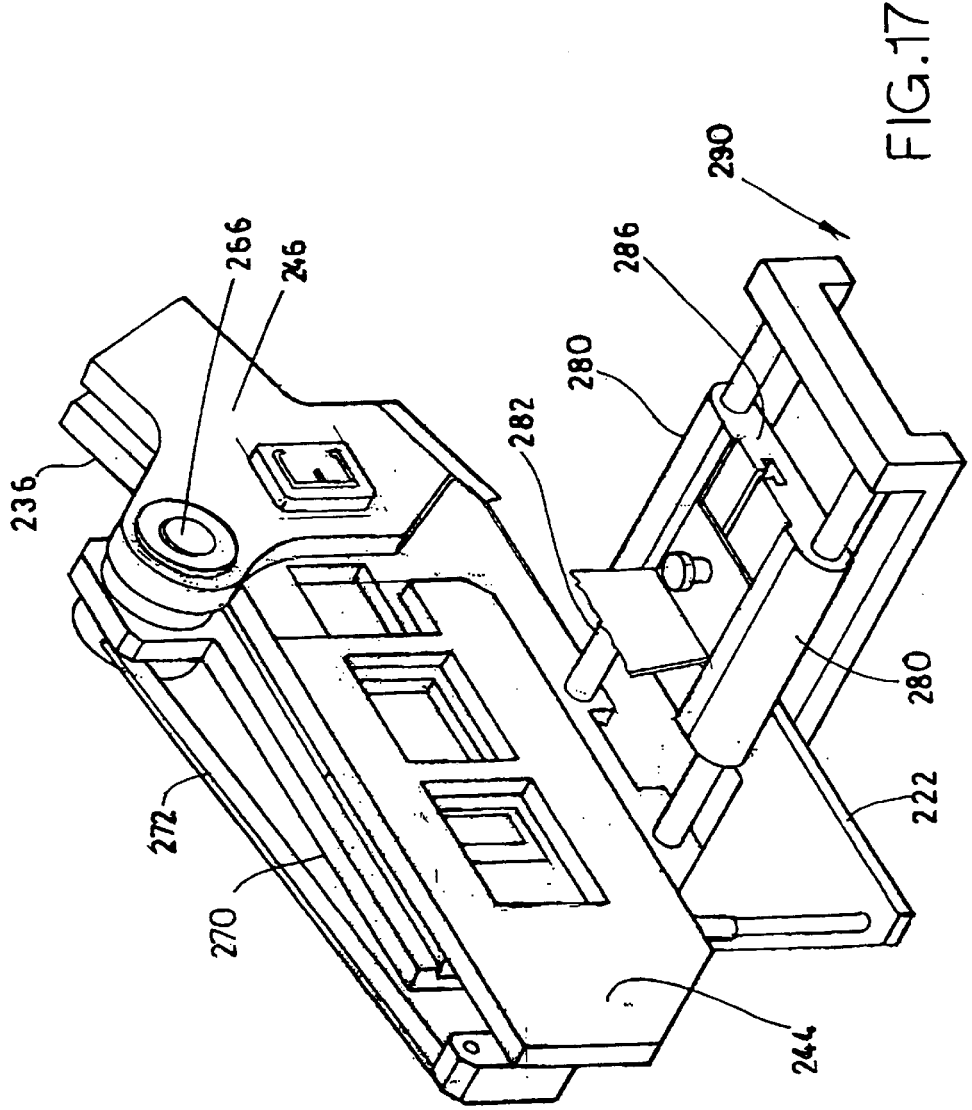
FIG. 17 is a perspective illustration of a modified form of end trim device, for trimming blinds of a somewhat different type, usually two inch blinds.
Figure 18:
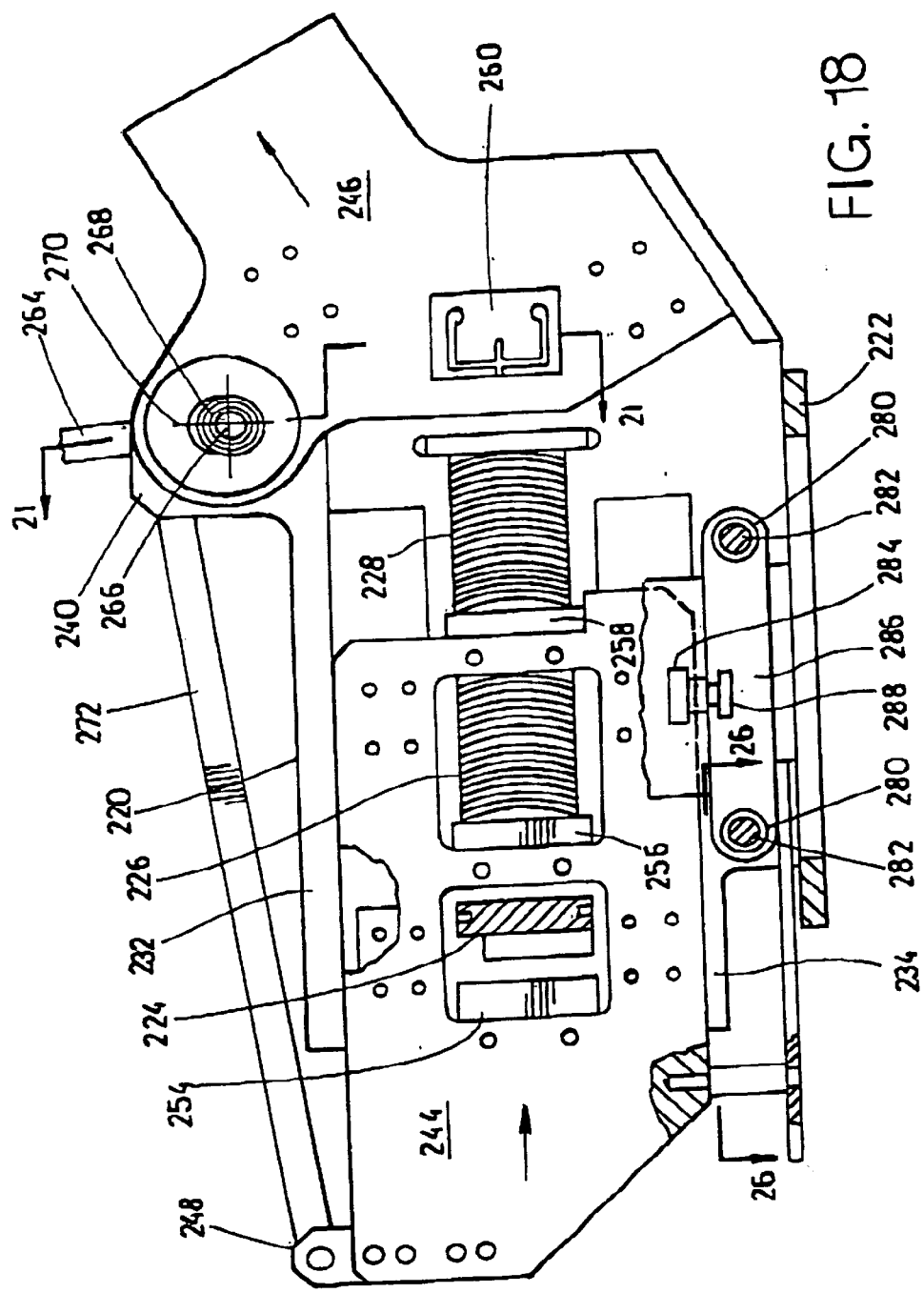
FIG. 18 is a side elevational view of the apparatus of FIG. 17.
Figure 19:
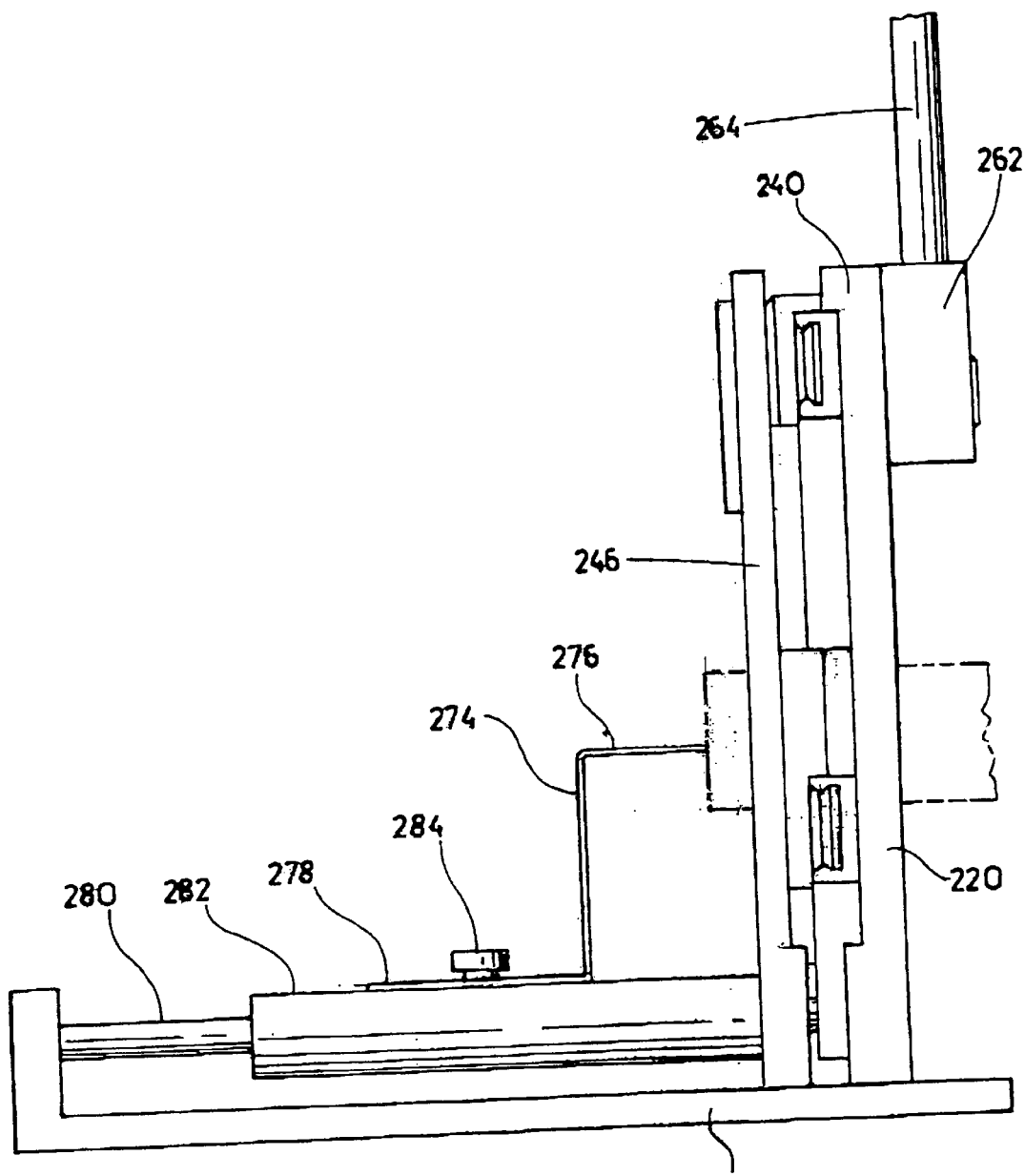
FIG. 19 is an end elevation of the apparatus of FIG. 18.
Figure 20:
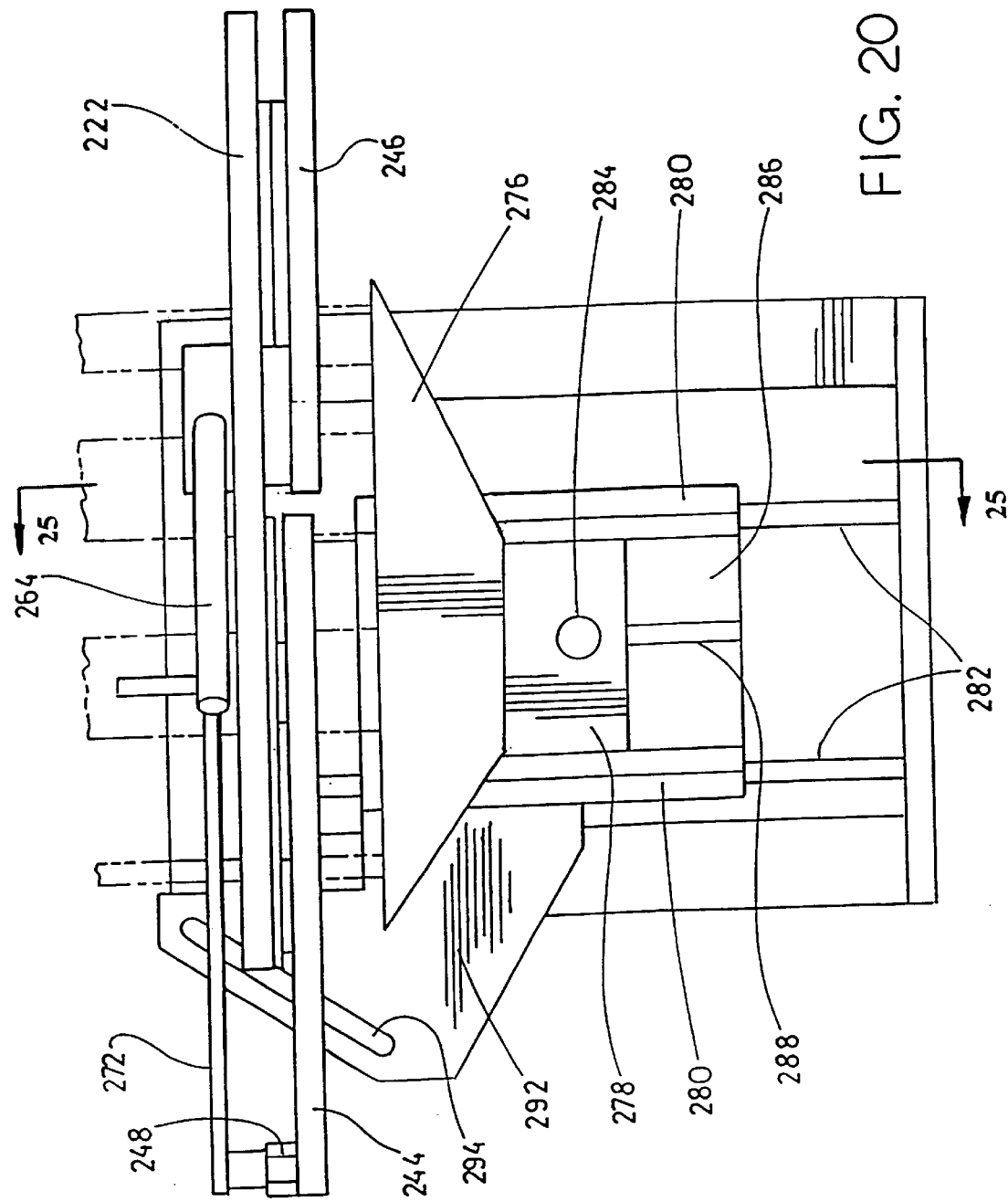
FIG. 20 is a top plan view of the apparatus of FIG. 18 and 19.

Referring now to FIGS. 17 and 18 this modified embodiment of the invention will be seen to comprise a main body plate 220, mounting on a suitable base to 222.

Figure 24:
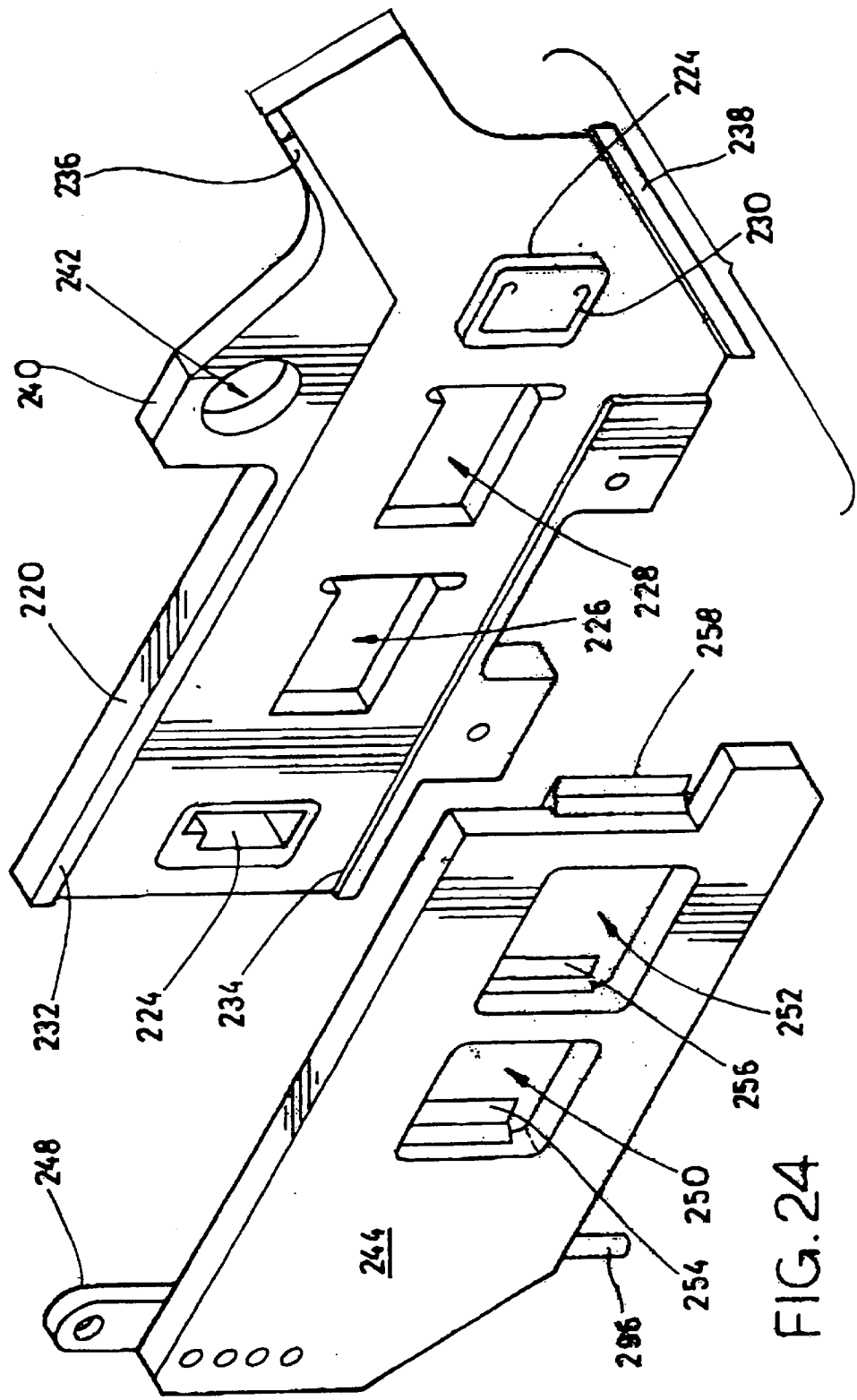
FIG. 24 is an exploded perspective of a main body and a cutter block.

The main body 220 is provided with a bottom rail recess 224, two blind slat recesses 226–228, and a head rail recess 230 (FIG. 24).

The main body 220 is further provided with a pair of generally horizontal spaced apart guide rails 232 and 234, and a pair of generally diagonally guide rails 236 and 238. The main body 220 is also provided with a bearing body 240 with a bearing recess 242 therein.

There are two cutting blade blocks, namely a first cutting blade block 244 (FIGS. 18 and 24) and a second diagonal cuffing blade block 246. First cutting blade block 244 has an upstanding attachment lug 248 for reasons described below. First cutting blade block 244 further has a bottom rail cutting recess 250, and a first blind slat cutting recess 252. There are three cutting blades mounting on first cutting block 244 namely a bottom rail cuffing blade 254, a first blind slat cutting blade 256 and a second blind slat cutting blade 258.

The blades 254, 256 and 258 register respectively with the edges of openings 224, 226 and 228, in main body 220 (FIGS. 18 and 24).

In order to cut the head rail of a blind, the diagonal cutting block 246 is formed with a head rail cutting die 260, which is adapted in one position to register with the head rail opening recess 230 in the main body 220.

The recesses 224, 226, 228 and 230 in the main body 220 are all aligned along a common horizontal axis, so that the blind components namely the bottom rail, the bundles of slats, and the head rail can be slid into the respective recesses simultaneously, without disturbing the arrangement of the blind itself.

Similarly the recesses in the blade block 244 namely 250, 252 and the blades 254, 256, and 258 all register with respective openings 224, 226 and 228.

The head rail cutting die 260 registers with the head rail recess 230, and again the blades and cutting die are all aligned along a horizontal axis.

In order to move the blade block 244, and also to move the die block 246, a drive shaft 262 is rotatably mounted in bearing recess 242 in bearing body 240. Shaft 262 is connected to a manual operating lever 264, by means of which shaft 262 may be rotated to and fro.

A stub shaft 266 extends from shaft 262 along an eccentric axis. Stub shaft 266 engages in bearing 268, which is in turn received in a drive recess 270 in blade block 246.

In this way, rotation of shaft 262 by lever 268 will cause the eccentric stub shaft 266 to apply a diagonal movement to blade block 246. It will be noted that the diagonal location of the stub shaft 266 relative to the drive shaft 262 causes a very substantial mechanical advantage as between the operation of the lever 264 and the shaft 262, so as to provide adequate cutting force, to move the cutting die 260 (FIG. 23) relative to the headrail recess 224, and produce a clean shearing action.

In order to move blade block 244, connecting rod 272 is connected between lug 248, and lever 262. Thus rotational swinging movement of manual lever 264 will cause rod 272 to move the entire blade block 244, thereby shearing the bottom rail, and the blind slats progressively as the blade block 244 moves along its linear horizontal axis.

Figure 25:
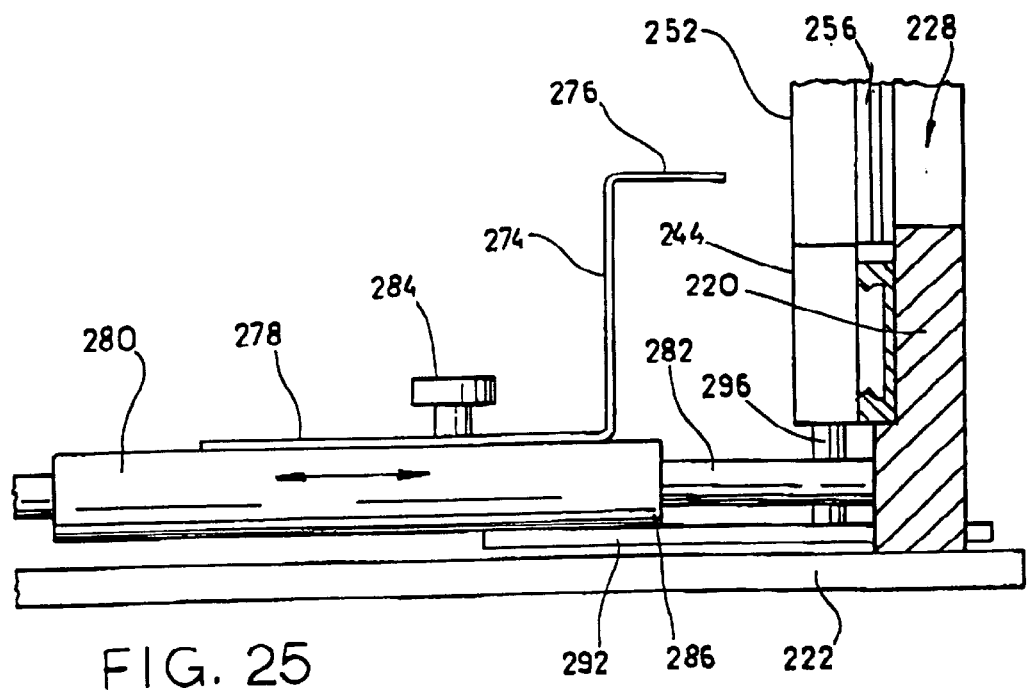
FIG. 25 is a section along the line 25—25 of FIG. 20.
Figure 26:
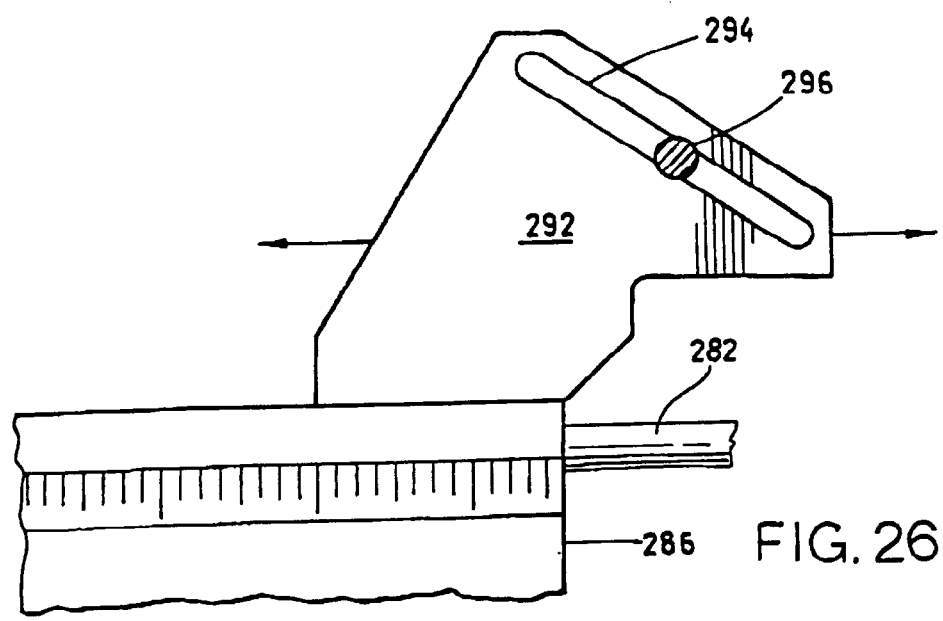
FIG. 26 is a section along the line 26—26 of the FIG. 18.

In order to provide an end stop for the bottom rail, blind slats, and headrail, so that the length being cut off can be preset by adjusting the end stop and setting it to a predetermined position, an end stop is provided generally as shown in FIGS. 17, 25 and 26.

The actual end stop consists of a generally Z-shaped plate member 274, having an upper stop portion 276 adapted to register with the various blades and cutting recesses along the predetermined horizontal axis referred to, and having a lower adjustment portion 278, which is slidably mounted on a pair of bearing sleeves 280 slidably mounted on parallel slide bars 282.

A hand-operated screw lock 284 permits the end stop 274 to be adjusted to and fro along the bearing sleeves 280. It will be appreciated from FIGS. 17 and 18, that there is a mounting body 286 extending between the two sleeves 280, and having an adjustable fastening groove 288 for receiving a nut (not shown) connected to screw 284. Shafts 282 are mounted on any suitable base frame and legs indicated generally as 290.

In this way, the end stop plate 276 can be adjusted towards or away from the main body 220 and blade blocks 244 and 246, and will effectively stop the insertion of the blind components namely the bottom rail, the blind slats, and the headrail, beyond the point where they contact the stop 276.

The position of the stop 276 can be adjusted by operating the screw 284 and sliding the entire plate 278 to and fro.

It will of course be appreciated that once the actual cuts have taken place, that it is desirable to have the end stop 276 moved away so that the cutoff portions can readily be cleared away.

This movement is achieved by means of a guide plate 292 connected to the underneath of body 286, and extending outwardly to one side thereof. Plate 292 is provided with a diagonal linear slot 294. A control pin 296 extends through slot 294, pin 296 being mounted in blade block 244, whereby movement of blade block 244 will move the pin 296, along the diagonal slot 244 thereby causing movement of the plate 292 and associated body 286 away from the blade blocks 244 and 246.

It will thus be seen that in this embodiment of the invention, cutting of the bottom rail and blind slats will take place as a result of movement of the cutting block 244 and its associated blades 254, 256 and 258, and cutting or shearing of the headrail will take place as a result of the diagonal movement of the block 246, and the shearing action between the headrail opening 224 in the main body 220, and the headrail cutting die 260 in the diagonal cutting block 246.

The operation of the end stop and its movement to and fro is self explanatory from the above description.

Figure 27:
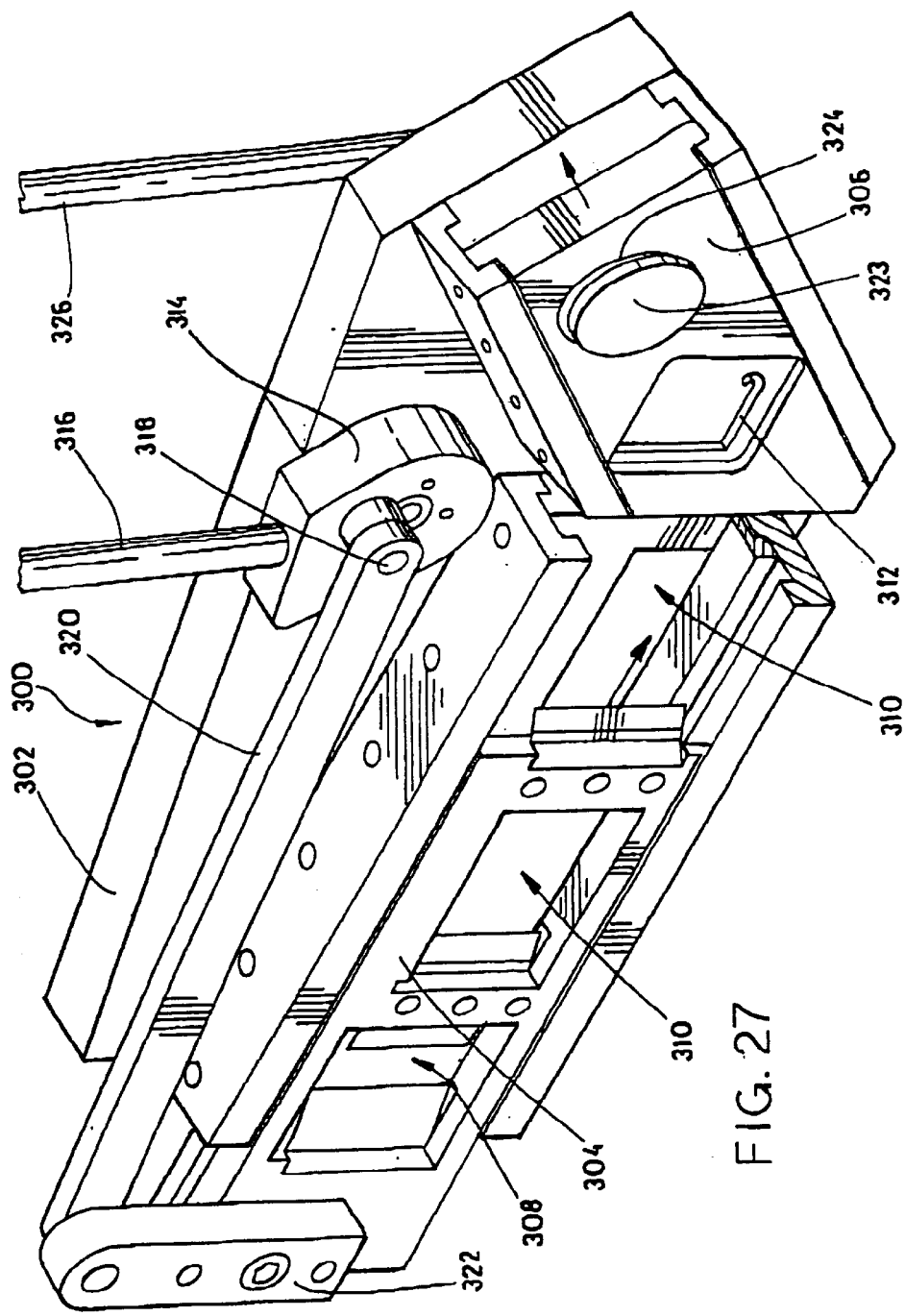
FIG. 27 is a perspective illustration of a further embodiment of the invention; and, FIG. 28 is a side elevation of FIG. 27.
Figure 28:
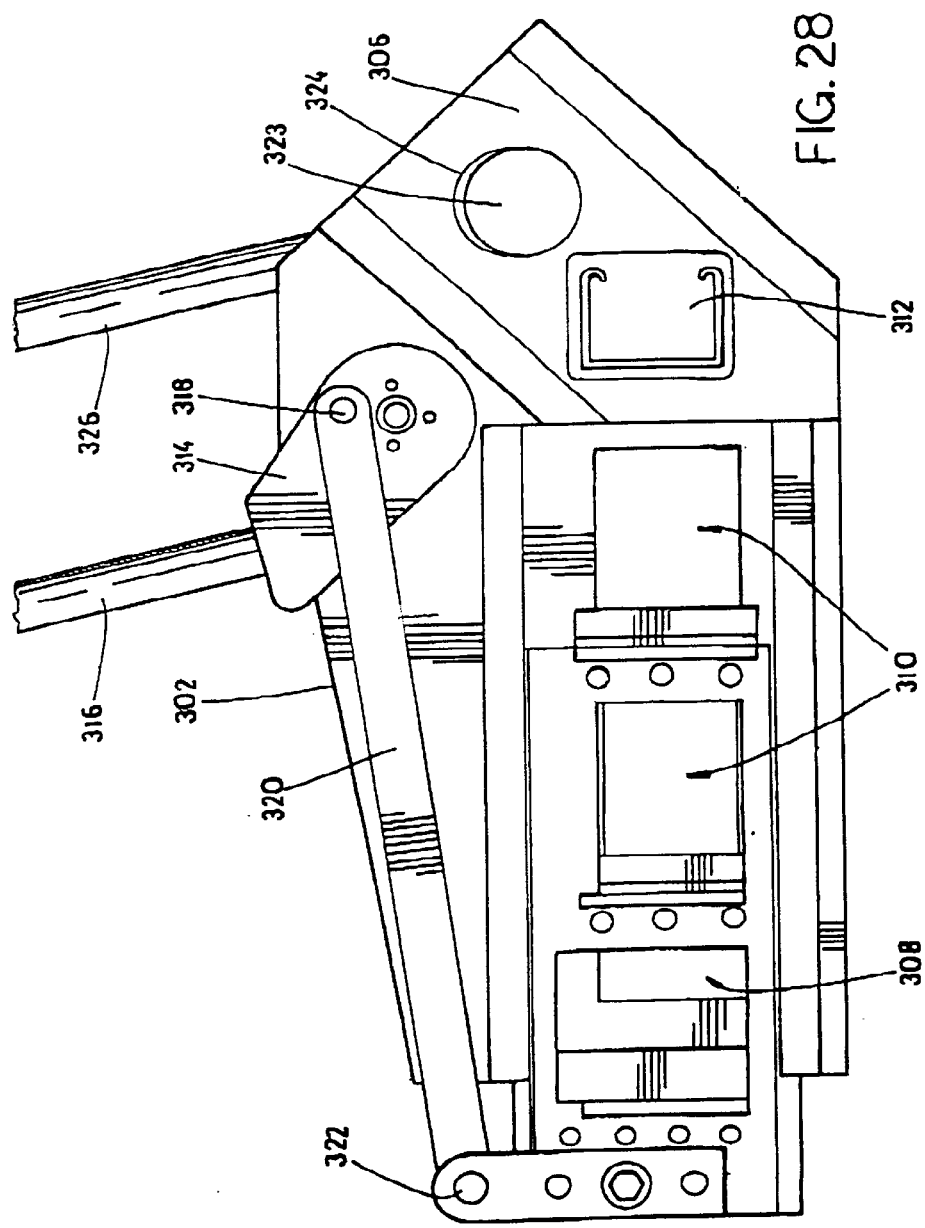

According to a further embodiment as illustrated in FIGS. 27 and 28, a modified form of end trimming device is illustrated generally as 300. It has a main body 302, and a first horizontal cutting block 304, and a second diagonal cutting block 306.

These two cutting blocks are provided with the usual openings indicated as 308, 310 and 312 for cutting respectively, the bottom rail, the bundles of blind slats and the head rail.

In order to reduce the loading on the manual cutter mechanism, in this embodiment of the invention, there are two manual mechanisms. The first manual cutter mechanism comprises the shaft and block 314 operated by a first arm 316. An offset crank pin 318 connects a linkage 320 to an upright post 322 for moving block 304.

This mechanism is not connected in any way to the diagonal block 306.

The diagonal block 306 is however moved by an eccentric rotary cam 323, which is received in opening 324 in block 306. The cam 323 is operated by a shaft (not shown) which is in turn operated by a manual lever 326.

Thus in this mechanism, the bottom slat and the bundles of blind slats and the headrail are all placed in their respective openings. The first lever 316 is then operated to cut the bottom rail and the bundles of blind slats by moving the block 304 horizontally.

When that has been completed, then the second lever 326 is operated, so as to move the diagonal block 306 thereby cutting the headrail.

It will of course be appreciated that this device will usually be provided with suitable end stops of the type shown in FIGS. 19, 20, 25 and 26.

The operation of the cam 324 will be similar to that illustrated in FIG. 22.

The foregoing is a description of a preferred embodiment of the invention which is given here by way of example only. The invention is not to be taken as limited to any of the specific features as described, but comprehends all such variations thereof as come within the scope of the appended claims.

What is claimed is:

1. A method of trimming the width of Venetian blinds having a head rail, a plurality of blind slats and a bottom rail, each of said head rail, said plurality of blind slats and said bottom rail having first and second opposed ends, the method comprising the steps of:

placing said first end of said head rail through a corresponding head rail opening in a support body and into a position proximate a first cutter;

rotating a crank to cause rotation of a cam, said cam rotation urging said first cutter to move relative to said head rail opening, whereby said first cutter cuts said first end of said head rail;

plating said first end of said plurality of blind slats through a corresponding opening in said support body while placing said head rail through said head rail opening;

cutting said first end of said plurality of blind slats with a second cutter, wherein said first and second cutters are connected by a lost-motion linkage so that said cutting of said plurality of blind slats and said cutting of said head rail begin at different times.

2. A method of trimming the width of venetian blinds having at least a head rail, a plurality of slats and a bottom rail, each of said head rail, slats and bottom rail having first and second opposed ends, said method comprising the steps of:

placing a first end of said head rail through a corresponding opening in a support body and into a position proximate a first cutter;

placing a first end of at least said slats through a slat opening in said support body proximate a second cutter, said first and second cutters being connected to each other by a lost-motion mechanism; and moving a selected one of said first and second cutters such that said lost-motion mechanism causes the other of said first and second cutters to begin movement after said selected one of said cutters begins its movement.

3. A method as claimed in claim 2, wherein said first cutter begins movement prior to said second cutter.

4. A method as claimed in claim 2, wherein said movement of said selected cutter is caused by the rotation of a cam.

5. A method of trimming the width of venetian blinds having at least a head rail, a plurality of slats and a bottom rail, each of said head rail, slats and bottom rail having first and second opposed ends, said method comprising the steps of:

placing a first end of said head rail through a corresponding opening in a support body and into a position proximate a first cutter;

placing a first end of at least said bottom rail through a bottom rail opening in said support body proximate a second cutter, said first and second cutters being connected to each other by a lost-motion mechanism; and moving a selected one of said first and second cutters such that said lost-motion mechanism causes the other of said first and second cutters to begin movement after said selected one of said cutters begins its movement.

6. A method as claimed in claim 5, wherein said first cutter begins movement prior to said second cutter.

7. A method as claimed in claim 5, wherein said movement of said selected cutter is caused by the rotation of a cam.

* * * * *